United States Patent
Turgeman

(10) Patent No.: US 10,298,614 B2
(45) Date of Patent: **\*May 21, 2019**

(54) SYSTEM, DEVICE, AND METHOD OF GENERATING AND MANAGING BEHAVIORAL BIOMETRIC COOKIES

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 129 days.

This patent is subject to a terminal disclaimer.

(21) Appl. No.: 15/708,155

(22) Filed: Sep. 19, 2017

(65) Prior Publication Data

US 2018/0034850 A1 Feb. 1, 2018

Related U.S. Application Data

(63) Continuation-in-part of application No. 15/422,479, filed on Feb. 2, 2017, now Pat. No. 9,779,423, and a
(Continued)

(51) Int. Cl.
*G06F 17/30* (2006.01)
*H04L 29/06* (2006.01)
(Continued)

(52) U.S. Cl.
CPC .......... *H04L 63/1458* (2013.01); *G06F 3/041* (2013.01); *G06F 3/0488* (2013.01);
(Continued)

(58) Field of Classification Search
CPC ........ G06F 21/32; G06F 21/31; G06F 21/316; G06F 21/554; G06F 3/0488; G06F 21/36;
(Continued)

(56) References Cited

U.S. PATENT DOCUMENTS 3,618,019 A * 11/1971 Nemirovsky ...... G06K 9/00154
178/20.01
3,699,517 A * 10/1972 Dyche ................ G06K 9/00154
382/122
(Continued)

FOREIGN PATENT DOCUMENTS

EP 2410450 1/2012
EP 2477136 7/2012
(Continued)

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.
(Continued)

*Primary Examiner* — Gary S Gracia
(74) *Attorney, Agent, or Firm* — Eitan Mehulal Sadot

(57) ABSTRACT

Devices, systems, and methods of generating and managing behavioral biometric cookies. The system monitors user-interactions of a user, that are performed via an input unit of an end-user device; and extracts a set of user-specific characteristics, which are used as a behavioral profile or behavioral signature. The set of user-specific characteristics are further used as a behavioral biometric cookie data-item, allowing the system to distinguish between two human users that utilize the same electronic device; and allowing the system to distinguish between a human user and an automated script. The system further allows creation and utilization of behavioral sub-cookies that distinguish among multiple users of the same device. The system also allows creation of a cross-device behavioral cookie, to track browsing or usage history of a single user across multiple electronic devices.

11 Claims, 3 Drawing Sheets

Related U.S. Application Data continuation-in-part of application No. 15/276,803, filed on Sep. 27, 2016, now Pat. No. 10,055,560, which is a continuation-in-part of application No. 14/325,398, filed on Jul. 8, 2014, now Pat. No. 9,477,826, and a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 14/325,938 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, said application No. 15/422,479 is a continuation-in-part of application No. 15/210,221, filed on Jul. 14, 2016, now Pat. No. 9,674,218, which is a continuation of application No. 14/675,768, filed on Jan. 1, 2015, now Pat. No. 9,418,221, and a continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942.

(60) Provisional application No. 62/312,140, filed on Mar. 23, 2016, provisional application No. 61/843,915, filed on Jul. 9, 2013, provisional application No. 61/417,479, filed on Nov. 29, 2010, provisional application No. 61/973,855, filed on Apr. 2, 2014.

(51) Int. Cl.

| | |
|---|---|
| *H04L 29/08* | (2006.01) |
| *G06F 21/55* | (2013.01) |
| *G06Q 30/02* | (2012.01) |
| *G06F 21/31* | (2013.01) |
| *G06F 21/32* | (2013.01) |
| *G06F 3/041* | (2006.01) |
| *G06F 3/0488* | (2013.01) |
| *H04L 12/26* | (2006.01) |
| *G06Q 10/06* | (2012.01) |
| *G06Q 10/10* | (2012.01) |
| *G06F 16/22* | (2019.01) |
| *G06F 7/04* | (2006.01) |
| *H04W 12/12* | (2009.01) |

(52) U.S. Cl.
CPC .............. *G06F 16/22* (2019.01); *G06F 21/31* (2013.01); *G06F 21/316* (2013.01); *G06F 21/32* (2013.01); *G06F 21/552* (2013.01); *G06F 21/554* (2013.01); *G06Q 10/063* (2013.01); *G06Q 10/0633* (2013.01); *G06Q 10/10* (2013.01); *G06Q 30/0248* (2013.01); *G06Q 30/0275* (2013.01); *G06Q 30/0277* (2013.01); *H04L 43/0876* (2013.01); *H04L 63/08* (2013.01); *H04L 63/0861* (2013.01); *H04L 63/10* (2013.01); *H04L 63/102* (2013.01); *H04L 63/1408* (2013.01); *H04L 67/02* (2013.01); *H04L 67/22* (2013.01); *H04L 67/306* (2013.01); *G06F 2221/2133* (2013.01); *H04L 2463/102* (2013.01); *H04L 2463/144* (2013.01); *H04W 12/12* (2013.01)

(58) Field of Classification Search
CPC .......... G06F 21/552; G06F 2221/2133; H04L 63/0861; H04L 63/1416; H04L 63/0428; H04L 63/08; H04L 63/083; H04L 63/102; H04L 63/126
See application file for complete search history.

(56) References Cited

U.S. PATENT DOCUMENTS

| | | | | |
|---|---|---|---|---|
| 3,983,535 A * | 9/1976 | Herbst | ............... | G06K 9/00154 382/122 |
| 4,128,829 A * | 12/1978 | Herbst | ............... | G06K 9/00154 382/120 |
| 4,621,334 A * | 11/1986 | Garcia | ................. | G06F 21/32 382/115 |
| 4,760,386 A * | 7/1988 | Heath | ................. | G06F 3/04892 345/161 |
| 4,805,222 A * | 2/1989 | Young | ................. | G06F 21/316 382/115 |
| 5,442,342 A * | 8/1995 | Kung | ..................... | G06F 21/34 235/382 |
| 5,485,171 A * | 1/1996 | Copper | ................. | G06F 3/0338 345/160 |
| 5,557,686 A * | 9/1996 | Brown | .................. | G06F 21/316 340/5.51 |
| 5,565,657 A * | 10/1996 | Merz | ..................... | G06F 3/0414 178/18.01 |
| 5,838,306 A * | 11/1998 | O'Connor | ........... | G06F 3/03543 345/163 |
| 5,874,941 A * | 2/1999 | Yamada | ................ | G06F 3/0346 345/157 |
| 5,999,162 A * | 12/1999 | Takahashi | ............. | G09G 1/162 345/440.1 |
| 6,337,686 B2 * | 1/2002 | Wong | .................... | G06T 11/203 345/443 |
| 6,337,919 B1 * | 1/2002 | Dunton | ................... | G06F 21/32 345/163 |
| 6,442,692 B1 * | 8/2002 | Zilberman | ........... | G06F 21/316 713/184 |
| 6,572,014 B1 * | 6/2003 | Lambert | ............. | G06F 3/03543 235/376 |
| 6,819,219 B1 * | 11/2004 | Bolle | ...................... | G06F 21/32 340/5.52 |
| 6,836,554 B1 * | 12/2004 | Bolle | ...................... | G06F 21/32 340/5.53 |
| 6,895,514 B1 * | 5/2005 | Kermani | ............... | G06F 21/316 726/19 |
| 6,938,061 B1 * | 8/2005 | Rumynin | .............. | G06F 7/5318 708/210 |
| 6,938,159 B1 * | 8/2005 | O'Connor | ............... | G06F 21/32 713/186 |
| 6,957,185 B1 * | 10/2005 | Labaton | ................. | G06Q 20/10 380/279 |
| 6,957,186 B1 * | 10/2005 | Guheen | .................. | G06Q 99/00 705/323 |
| 6,983,061 B2 * | 1/2006 | Ikegami | ................ | G06F 21/32 382/115 |
| 7,092,926 B2 * | 8/2006 | Cerrato | .................. | G06F 21/316 706/12 |
| 7,130,452 B2 * | 10/2006 | Bolle | .................. | G06F 21/6245 382/115 |
| 7,133,792 B2 * | 11/2006 | Murakami | ......... | G06K 9/00536 702/104 |
| 7,139,916 B2 * | 11/2006 | Billingsley | ............. | G06F 21/36 713/182 |
| 7,158,118 B2 * | 1/2007 | Liberty | ................... | G06F 3/017 345/158 |
| 7,236,156 B2 * | 6/2007 | Liberty | ................ | A61B 5/1171 345/158 |
| 7,245,218 B2 * | 7/2007 | Ikehara | ............... | G06F 3/03543 340/5.53 |
| 7,494,061 B2 * | 2/2009 | Reinhold | ............ | H04L 63/0861 235/382 |

(56) References Cited

U.S. PATENT DOCUMENTS

| | | | | |
|---|---|---|---|---|
| 7,523,191 B1* | 4/2009 | Thomas | G06F 11/3438 | 709/202 |
| 7,535,456 B2* | 5/2009 | Liberty | G06F 3/017 | 345/157 |
| 7,606,915 B1* | 10/2009 | Calinov | G06F 21/36 | 709/229 |
| 7,796,013 B2* | 9/2010 | Murakami | A61B 5/1171 | 340/5.82 |
| 7,818,290 B2* | 10/2010 | Davis | G06Q 30/02 | 707/603 |
| 7,860,870 B2* | 12/2010 | Sadagopan | G06F 16/9535 | 707/748 |
| 8,031,175 B2* | 10/2011 | Rigazio | G06F 3/04883 | 345/158 |
| 8,065,624 B2* | 11/2011 | Morin | G06F 3/0237 | 715/773 |
| 8,125,312 B2* | 2/2012 | Orr | G08C 19/00 | 340/5.3 |
| 8,156,324 B1* | 4/2012 | Shnowske | G06Q 40/00 | 463/36 |
| 8,201,222 B2* | 6/2012 | Inoue | H04L 63/08 | 726/4 |
| 8,417,960 B2* | 4/2013 | Takahashi | H04L 9/0866 | 340/5.82 |
| 8,433,785 B2* | 4/2013 | Awadallah | H04L 63/1425 | 709/224 |
| 8,449,393 B2* | 5/2013 | Sobel | G06F 3/033 | 340/5.82 |
| 8,499,245 B1* | 7/2013 | Froment | H04L 67/22 | 715/734 |
| 8,510,113 B1* | 8/2013 | Conkie | G10L 13/00 | 704/258 |
| 8,548,208 B2* | 10/2013 | Schultz | G06F 21/32 | 340/5.8 |
| 8,555,077 B2* | 10/2013 | Davis | G06F 21/316 | 713/182 |
| 8,745,729 B2* | 6/2014 | Poluri | G06F 21/31 | 726/2 |
| 8,788,838 B1* | 7/2014 | Fadell | G06F 21/316 | 713/186 |
| 8,803,797 B2* | 8/2014 | Scott | G06F 1/1626 | 345/156 |
| 8,819,812 B1* | 8/2014 | Weber | G06F 3/017 | 726/19 |
| 8,832,823 B2* | 9/2014 | Boss | G06F 21/36 | 726/16 |
| 8,838,060 B2* | 9/2014 | Walley | G06F 3/033 | 455/403 |
| 8,941,466 B2* | 1/2015 | Bayram | G06F 21/316 | 340/5.82 |
| 9,154,534 B1* | 10/2015 | Gayles | H04L 65/60 | |
| 9,174,123 B2* | 11/2015 | Nasiri | G06F 1/1694 | |
| 9,195,351 B1* | 11/2015 | Rosenberg | G06F 1/1626 | |
| 9,282,112 B2* | 3/2016 | Filatov | H04L 63/1408 | |
| 9,301,140 B1* | 3/2016 | Costigan | H04W 12/06 | |
| 9,304,915 B2* | 4/2016 | Adams | G06F 12/1063 | |
| 9,529,987 B2* | 12/2016 | Deutschmann | H04L 67/22 | |
| 9,589,120 B2* | 3/2017 | Samuel | G06F 21/32 | |
| 2001/0004733 A1* | 6/2001 | Eldering | G06Q 20/20 | 705/14.41 |
| 2002/0023229 A1* | 2/2002 | Hangai | G06F 21/32 | 726/21 |
| 2002/0089412 A1* | 7/2002 | Heger | G06F 3/017 | 340/5.82 |
| 2003/0033526 A1* | 2/2003 | French | G06F 21/31 | 713/168 |
| 2003/0074201 A1* | 4/2003 | Grashey | G10L 17/22 | 704/273 |
| 2003/0137494 A1* | 7/2003 | Tulbert | G06F 3/0423 | 345/173 |
| 2003/0212811 A1* | 11/2003 | Thornton | G06F 3/1431 | 709/231 |
| 2004/0015714 A1* | 1/2004 | Abraham | G06Q 20/3821 | 726/4 |
| 2004/0017355 A1* | 1/2004 | Shim | G06F 3/0338 | 345/157 |
| 2004/0021643 A1* | 2/2004 | Hoshino | G06F 3/016 | 345/173 |
| 2004/0034784 A1* | 2/2004 | Fedronic | G06F 21/32 | 713/186 |
| 2004/0062423 A1* | 4/2004 | Doi | G06K 9/00221 | 382/118 |
| 2004/0111523 A1* | 6/2004 | Hall | H04L 29/06 | 709/230 |
| 2004/0123156 A1* | 6/2004 | Hammond, II | H04L 9/0891 | 726/4 |
| 2004/0143737 A1* | 7/2004 | Teicher | G06K 7/1095 | 713/167 |
| 2004/0186882 A1* | 9/2004 | Ting | H04L 63/0861 | 709/202 |
| 2004/0221171 A1* | 11/2004 | Ahmed | G06F 21/316 | 726/23 |
| 2005/0008148 A1* | 1/2005 | Jacobson | G06F 3/038 | 380/26 |
| 2005/0179657 A1* | 8/2005 | Russo | G06F 3/038 | 345/163 |
| 2005/0289264 A1* | 12/2005 | Illowsky | G06F 1/3203 | 710/104 |
| 2006/0006803 A1* | 1/2006 | Huang | H01J 61/0672 | 313/607 |
| 2006/0080263 A1* | 4/2006 | Willis | G06F 21/33 | 705/76 |
| 2006/0090073 A1* | 4/2006 | Steinberg | G06F 21/31 | 713/170 |
| 2006/0123101 A1* | 6/2006 | Buccella | G06F 21/552 | 709/223 |
| 2006/0143454 A1* | 6/2006 | Walmsley | G06F 21/85 | 713/170 |
| 2006/0195328 A1* | 8/2006 | Abraham | G06Q 20/204 | 235/382 |
| 2006/0215886 A1* | 9/2006 | Black | G06K 9/0002 | 382/124 |
| 2006/0224898 A1* | 10/2006 | Ahmed | G06F 21/316 | 713/186 |
| 2006/0282660 A1* | 12/2006 | Varghese | G06Q 20/341 | 713/155 |
| 2006/0284969 A1* | 12/2006 | Kim | G06F 21/316 | 348/14.01 |
| 2007/0156443 A1* | 7/2007 | Gurvey | G06Q 10/02 | 705/64 |
| 2007/0174082 A1* | 7/2007 | Singh | G06Q 20/20 | 705/44 |
| 2007/0183633 A1* | 8/2007 | Hoffmann | G06K 9/00221 | 382/116 |
| 2007/0214426 A1* | 9/2007 | Ruelle | G06F 3/0481 | 715/767 |
| 2007/0236330 A1* | 10/2007 | Cho | G06F 21/305 | 340/5.54 |
| 2007/0240230 A1* | 10/2007 | O'Connell | G06F 21/55 | 726/28 |
| 2007/0250920 A1* | 10/2007 | Lindsay | G06F 21/31 | 726/7 |
| 2007/0255821 A1* | 11/2007 | Ge | G06Q 10/00 | 709/224 |
| 2007/0266305 A1* | 11/2007 | Cong | G06Q 30/02 | 715/700 |
| 2007/0271466 A1* | 11/2007 | Mak | G06F 21/316 | 713/184 |
| 2007/0283416 A1* | 12/2007 | Renaud | G06F 21/31 | 726/2 |
| 2008/0046982 A1* | 2/2008 | Parkinson | H04L 9/0891 | 726/5 |
| 2008/0068343 A1* | 3/2008 | Hoshino | G06F 3/016 | 345/173 |
| 2008/0084972 A1* | 4/2008 | Burke | G06Q 10/107 | 379/88.02 |
| 2008/0091639 A1* | 4/2008 | Davis | G06Q 30/02 | |

(56) References Cited

U.S. PATENT DOCUMENTS

| | | | |
|---|---|---|---|
| 2008/0092209 A1* | 4/2008 | Davis | G06F 21/316 726/2 |
| 2008/0092245 A1* | 4/2008 | Alward | G06F 21/316 726/28 |
| 2008/0097851 A1* | 4/2008 | Bemmel | G06Q 30/02 705/14.36 |
| 2008/0098456 A1* | 4/2008 | Alward | G06F 21/316 726/1 |
| 2008/0120717 A1* | 5/2008 | Shakkarwar | G06F 21/33 726/18 |
| 2008/0136790 A1* | 6/2008 | Hio | G06F 3/04817 345/173 |
| 2008/0162449 A1* | 7/2008 | Chao-Yu | G06F 21/51 |
| 2008/0183745 A1* | 7/2008 | Cancel | G06Q 30/02 |
| 2008/0192005 A1* | 8/2008 | Elgoyhen | G06F 3/014 345/158 |
| 2008/0200310 A1* | 8/2008 | Tagliabue | A63B 24/0062 482/8 |
| 2008/0211766 A1* | 9/2008 | Westerman | G06F 3/038 345/156 |
| 2008/0215576 A1* | 9/2008 | Zhao | G06F 16/337 |
| 2008/0263636 A1* | 10/2008 | Gusler | G06F 21/316 726/4 |
| 2008/0298588 A1* | 12/2008 | Shakkarwar | G06Q 20/02 380/255 |
| 2008/0301808 A1* | 12/2008 | Calo | G06F 21/55 726/23 |
| 2009/0037983 A1* | 2/2009 | Chiruvolu | G06F 21/31 726/4 |
| 2009/0038010 A1* | 2/2009 | Ma | G06F 11/3672 726/23 |
| 2009/0089879 A1* | 4/2009 | Wang | G06F 21/53 726/24 |
| 2009/0094311 A1* | 4/2009 | Awadallah | H04L 63/1408 709/202 |
| 2009/0132395 A1* | 5/2009 | Lam | G06Q 30/02 705/30 |
| 2009/0157792 A1* | 6/2009 | Fiatal | G06Q 30/04 709/201 |
| 2009/0172551 A1* | 7/2009 | Kane | G06Q 30/02 715/733 |
| 2009/0189736 A1* | 7/2009 | Hayashi | G06F 21/32 340/5.81 |
| 2009/0199296 A1* | 8/2009 | Xie | G06F 21/316 726/23 |
| 2009/0227232 A1* | 9/2009 | Matas | H04M 1/665 455/411 |
| 2009/0241188 A1* | 9/2009 | Komura | H04L 63/1416 726/22 |
| 2009/0254336 A1* | 10/2009 | Dumais | G06F 9/451 704/9 |
| 2009/0281979 A1* | 11/2009 | Tysowski | G06F 3/0237 706/52 |
| 2009/0293119 A1* | 11/2009 | Jonsson | G06F 21/36 726/19 |
| 2009/0320123 A1* | 12/2009 | Yu | G06F 21/316 726/16 |
| 2010/0007632 A1* | 1/2010 | Yamazaki | H01L 27/3234 345/175 |
| 2010/0040293 A1* | 2/2010 | Hermann | G06K 9/00355 382/218 |
| 2010/0042387 A1* | 2/2010 | Gibbon | G06Q 30/02 703/6 |
| 2010/0042403 A1* | 2/2010 | Chandrasekar | G06F 17/27 704/9 |
| 2010/0046806 A1* | 2/2010 | Baughman | G06F 21/316 382/115 |
| 2010/0070405 A1* | 3/2010 | Joa | G06Q 20/10 705/38 |
| 2010/0077470 A1* | 3/2010 | Kozat | H04L 63/14 726/11 |
| 2010/0082747 A1* | 4/2010 | Yue | G06F 16/954 709/204 |
| 2010/0082998 A1* | 4/2010 | Kohavi | G06F 21/36 713/182 |
| 2010/0115610 A1* | 5/2010 | Tredoux | G06F 21/316 726/19 |
| 2010/0122082 A1* | 5/2010 | Deng | H04L 63/0421 713/159 |
| 2010/0125816 A1* | 5/2010 | Bezos | G06F 1/1626 715/863 |
| 2010/0138370 A1* | 6/2010 | Wu | G06Q 30/02 706/12 |
| 2010/0164897 A1* | 7/2010 | Morin | G06F 3/0237 345/173 |
| 2010/0171753 A1* | 7/2010 | Kwon | G06F 1/3218 345/593 |
| 2010/0197352 A1* | 8/2010 | Runstedler | G06F 3/0233 455/566 |
| 2010/0269165 A1* | 10/2010 | Chen | G06F 21/316 726/7 |
| 2010/0281539 A1* | 11/2010 | Burns | H04L 63/1441 726/23 |
| 2010/0287229 A1* | 11/2010 | Hauser | G06F 21/316 709/203 |
| 2010/0321304 A1* | 12/2010 | Rofougaran | G06F 3/046 345/173 |
| 2010/0328074 A1* | 12/2010 | Johnson | G06F 21/31 340/573.1 |
| 2011/0010209 A1* | 1/2011 | McNally | G06Q 10/06 705/7.11 |
| 2011/0012829 A1* | 1/2011 | Yao | G06F 3/045 345/157 |
| 2011/0016320 A1* | 1/2011 | Bergsten | H04L 63/08 713/170 |
| 2011/0016534 A1* | 1/2011 | Jakobsson | G06F 21/316 726/28 |
| 2011/0018828 A1* | 1/2011 | Wu | G06F 3/04883 345/173 |
| 2011/0023115 A1* | 1/2011 | Wright | G06F 21/552 726/22 |
| 2011/0029902 A1* | 2/2011 | Bailey | G06F 21/36 715/764 |
| 2011/0039602 A1* | 2/2011 | McNamara | G06F 3/017 455/566 |
| 2011/0043475 A1* | 2/2011 | Rigazio | G06F 3/04883 345/173 |
| 2011/0050394 A1* | 3/2011 | Zhang | G06F 3/045 340/5.82 |
| 2011/0063211 A1* | 3/2011 | Hoerl | H04L 41/04 345/157 |
| 2011/0065504 A1* | 3/2011 | Dugan | A63F 13/212 463/31 |
| 2011/0102570 A1* | 5/2011 | Wilf | G06F 3/017 348/77 |
| 2011/0105859 A1* | 5/2011 | Popovic | A61B 5/02405 600/301 |
| 2011/0113388 A1* | 5/2011 | Eisen | G06F 21/32 715/856 |
| 2011/0154273 A1* | 6/2011 | Aburada | G03F 1/36 716/52 |
| 2011/0159650 A1* | 6/2011 | Shiraishi | H01L 29/0856 438/269 |
| 2011/0159850 A1* | 6/2011 | Faith | G06Q 30/0201 455/411 |
| 2011/0162076 A1* | 6/2011 | Song | G06F 21/554 726/26 |
| 2011/0191820 A1* | 8/2011 | Ivey | G06F 16/00 726/3 |
| 2011/0193737 A1* | 8/2011 | Chiueh | G08C 23/02 341/176 |
| 2011/0202453 A1* | 8/2011 | Issa | G06Q 10/00 705/39 |
| 2011/0221684 A1* | 9/2011 | Rydenhag | G06F 3/041 345/173 |
| 2011/0223888 A1* | 9/2011 | Esaki | G06F 21/32 455/411 |

(56) References Cited

U.S. PATENT DOCUMENTS

| | | | |
|---|---|---|---|
| 2011/0225644 A1* | 9/2011 | Pullikottil | H04L 63/1425 726/11 |
| 2011/0246902 A1* | 10/2011 | Tsai | G06F 3/038 715/740 |
| 2011/0248941 A1* | 10/2011 | Abdo | G06F 3/0488 345/173 |
| 2011/0251823 A1* | 10/2011 | Davis | G06Q 30/02 702/181 |
| 2011/0271342 A1* | 11/2011 | Chung | G06F 21/554 726/23 |
| 2011/0276414 A1* | 11/2011 | Subbarao | G06Q 20/102 705/14.73 |
| 2011/0304531 A1* | 12/2011 | Brooks | G06F 1/1626 345/156 |
| 2011/0320822 A1* | 12/2011 | Lind | G06F 21/316 713/182 |
| 2012/0005483 A1* | 1/2012 | Patvarczki | G06F 21/36 713/182 |
| 2012/0005719 A1* | 1/2012 | McDougal | G06F 21/562 726/1 |
| 2012/0007821 A1* | 1/2012 | Zaliva | G06F 3/03547 345/173 |
| 2012/0054834 A1* | 3/2012 | King | G06F 21/31 726/4 |
| 2012/0096555 A1* | 4/2012 | Mahaffey | G06F 21/564 726/24 |
| 2012/0102551 A1* | 4/2012 | Bidare | G06F 21/36 726/4 |
| 2012/0113061 A1* | 5/2012 | Ikeda | G06F 3/041 345/175 |
| 2012/0124662 A1* | 5/2012 | Baca | G06F 21/32 726/17 |
| 2012/0133055 A1* | 5/2012 | Machida | H01L 24/06 257/777 |
| 2012/0154173 A1* | 6/2012 | Chang | G01S 7/032 340/904 |
| 2012/0154273 A1* | 6/2012 | McDade, Sr. | G06F 3/0338 345/157 |
| 2012/0154823 A1* | 6/2012 | Sakamoto | G03B 27/32 356/620 |
| 2012/0159599 A1* | 6/2012 | Szoke | G06F 21/32 726/7 |
| 2012/0164978 A1* | 6/2012 | Conti | G06F 21/32 455/411 |
| 2012/0167170 A1* | 6/2012 | Shi | G06F 21/32 726/2 |
| 2012/0174213 A1* | 7/2012 | Geiger | G06F 3/04883 726/19 |
| 2012/0188198 A1* | 7/2012 | Jeong | G06F 3/044 345/174 |
| 2012/0204257 A1* | 8/2012 | O'Connell | G06Q 30/06 726/19 |
| 2012/0218193 A1* | 8/2012 | Weber | G06F 1/1626 345/173 |
| 2012/0246737 A1* | 9/2012 | Paxton | G06F 21/316 726/27 |
| 2012/0252410 A1* | 10/2012 | Williams | G06F 21/36 455/411 |
| 2012/0278804 A1* | 11/2012 | Narayanasamy | G06F 9/45558 718/1 |
| 2012/0284380 A1* | 11/2012 | Anderson, III | H04L 29/06 709/223 |
| 2013/0024239 A1* | 1/2013 | Baker | G06Q 40/06 705/7.28 |
| 2013/0036416 A1* | 2/2013 | Raju | G06F 9/45558 718/1 |
| 2013/0076650 A1* | 3/2013 | Vik | G06F 3/0418 345/173 |
| 2013/0088434 A1* | 4/2013 | Masuda | G06F 1/3262 345/173 |
| 2013/0097682 A1* | 4/2013 | Zeljkovic | H04L 9/3231 726/7 |
| 2013/0097706 A1* | 4/2013 | Titonis | G06F 21/56 726/24 |
| 2013/0111586 A1* | 5/2013 | Jackson | G06F 11/3438 726/23 |
| 2013/0133055 A1* | 5/2013 | Ali | H04L 63/0861 726/7 |
| 2013/0135218 A1* | 5/2013 | Jain | G06F 3/0488 345/173 |
| 2013/0139248 A1* | 5/2013 | Rhee | G06F 3/0346 726/19 |
| 2013/0154999 A1* | 6/2013 | Guard | G06F 3/0487 345/174 |
| 2013/0162603 A1* | 6/2013 | Peng | G06F 3/0416 345/178 |
| 2013/0167212 A1* | 6/2013 | Azar | G06F 21/32 726/7 |
| 2013/0212674 A1* | 8/2013 | Boger | G06F 21/36 726/17 |
| 2013/0239195 A1* | 9/2013 | Turgeman | G06F 21/316 726/7 |
| 2013/0239206 A1* | 9/2013 | Draluk | G06F 21/00 726/19 |
| 2013/0282637 A1* | 10/2013 | Costigan | G06N 5/022 706/46 |
| 2013/0305357 A1* | 11/2013 | Ayyagari | H04W 12/06 726/22 |
| 2013/0312097 A1* | 11/2013 | Turnbull | G06F 21/55 726/24 |
| 2013/0335349 A1* | 12/2013 | Ferren | G06K 9/3266 345/173 |
| 2014/0033317 A1* | 1/2014 | Barber | G06Q 30/0242 726/26 |
| 2014/0041020 A1* | 2/2014 | Zhao | G06F 21/36 726/19 |
| 2014/0078061 A1* | 3/2014 | Simons | G06F 3/03543 345/163 |
| 2014/0078193 A1* | 3/2014 | Barnhoefer | G09G 3/3406 345/690 |
| 2014/0082369 A1* | 3/2014 | Waclawsky | G06F 21/62 713/189 |
| 2014/0111451 A1* | 4/2014 | Park | G06F 3/04883 345/173 |
| 2014/0118520 A1* | 5/2014 | Slaby | G06K 9/00926 348/77 |
| 2014/0143304 A1* | 5/2014 | Hegarty | G06F 11/3438 709/203 |
| 2014/0196119 A1* | 7/2014 | Hill | G06F 21/32 726/4 |
| 2014/0200953 A1* | 7/2014 | Mun | G06Q 10/04 705/7.28 |
| 2014/0250538 A1* | 9/2014 | Rapaport | G06F 21/31 726/28 |
| 2014/0259130 A1* | 9/2014 | Li | G06F 21/31 726/6 |
| 2014/0283059 A1* | 9/2014 | Sambamurthy | G06F 21/55 726/23 |
| 2014/0317734 A1* | 10/2014 | Valencia | G06F 21/552 726/22 |
| 2014/0337786 A1* | 11/2014 | Luo | G06F 3/0416 715/773 |
| 2014/0344927 A1* | 11/2014 | Turgeman | H04W 12/06 726/22 |
| 2015/0002479 A1* | 1/2015 | Kawamura | G06F 3/0414 345/178 |
| 2015/0012920 A1* | 1/2015 | De Santis | G06F 9/45533 718/1 |
| 2015/0062078 A1* | 3/2015 | Christman | G06F 3/0425 345/174 |
| 2015/0091858 A1* | 4/2015 | Rosenberg | G06F 3/0414 345/174 |
| 2015/0101031 A1* | 4/2015 | Harjanto | H04L 63/0876 726/7 |
| 2015/0146945 A1* | 5/2015 | Han | G06K 9/00033 382/125 |
| 2015/0213244 A1* | 7/2015 | Lymberopoulos | G06F 21/32 726/18 |

(56) References Cited

U.S. PATENT DOCUMENTS

| | | | |
|---|---|---|---|
| 2015/0268768 A1* | 9/2015 | Woodhull | G06F 3/0418 345/168 |
| 2016/0006800 A1* | 1/2016 | Summers | G06F 9/5055 709/203 |
| 2016/0034673 A1* | 2/2016 | Chandra | G06F 21/31 726/7 |
| 2016/0042164 A1* | 2/2016 | Goldsmith | H04L 63/08 726/7 |
| 2016/0077620 A1* | 3/2016 | Choi | G06F 3/0488 345/173 |
| 2016/0164905 A1* | 6/2016 | Pinney Wood | G06F 16/9024 726/25 |
| 2016/0164906 A1* | 6/2016 | Pinney Wood | G06F 16/9024 726/25 |
| 2016/0174044 A1* | 6/2016 | Jones | H04W 4/026 455/424 |
| 2016/0179245 A1* | 6/2016 | Johansson | G06F 3/044 345/174 |
| 2016/0191237 A1* | 6/2016 | Roth | H04L 9/0891 380/278 |
| 2016/0196414 A1* | 7/2016 | Stuntebeck | G01P 13/00 726/17 |
| 2016/0209948 A1* | 7/2016 | Tulbert | G06F 3/042 |
| 2016/0226865 A1* | 8/2016 | Chen | G06F 21/31 |
| 2016/0342826 A1* | 11/2016 | Apostolos | G06K 9/0008 |
| 2016/0364138 A1* | 12/2016 | Luo | G06F 3/04886 |
| 2017/0034210 A1* | 2/2017 | Talmor | H04L 67/02 |
| 2017/0048272 A1* | 2/2017 | Yamamura | G06F 21/14 |
| 2017/0090418 A1* | 3/2017 | Tsang | G03H 1/0841 |
| 2017/0149958 A1* | 5/2017 | Xian | G06F 21/31 |
| 2017/0193526 A1* | 7/2017 | Turgeman | G06Q 30/0185 |
| 2017/0195354 A1* | 7/2017 | Kesin | G06N 7/005 |
| 2017/0364919 A1* | 12/2017 | Ranganath | G06Q 20/4016 |
| 2018/0012227 A1* | 1/2018 | Tunnell | G06Q 20/40145 |
| 2018/0103047 A1* | 4/2018 | Turgeman | G01R 29/26 |
| 2018/0107836 A1* | 4/2018 | Boger | G06F 3/04886 |
| 2018/0115899 A1* | 4/2018 | Kedem | G06F 21/31 |
| 2018/0121640 A1* | 5/2018 | Turgeman | G06K 9/00335 |

FOREIGN PATENT DOCUMENTS

| | | |
|---|---|---|
| EP | 2610776 | 7/2013 |
| ES | 2338092 | 5/2010 |
| WO | 2007146437 | 12/2007 |
| WO | 2012073233 | 6/2012 |

OTHER PUBLICATIONS

Bailey, Kyle O., "Computer Based Behavioral Biometric Authentication Via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

\* cited by examiner

SYSTEM, DEVICE, AND METHOD OF GENERATING AND MANAGING BEHAVIORAL BIOMETRIC COOKIES

CROSS-REFERENCE TO RELATED APPLICATIONS

This application is a Continuation-In-Part (CIP) of U.S. patent application Ser. No. 15/422,479, filed on Feb. 2, 2017, which is currently in process to be issued as U.S. Pat. No. 9,779,423, which is hereby incorporated by reference in its entirety.

The above-mentioned U.S. patent application Ser. No. 15/422,479 claims priority and benefit from U.S. provisional patent application No. 62/312,140, filed on Mar. 23, 2016, which is hereby incorporated by reference in its entirety.

The above-mentioned U.S. patent application Ser. No. 15/422,479 is also a Continuation-in-Part (CIP) of U.S. patent application Ser. No. 15/276,803, filed Sep. 27, 2016, which is hereby incorporated by reference in its entirety.

The above-mentioned U.S. patent application Ser. No. 15/276,803 is a Continuation-in-Part (CIP) of U.S. patent application Ser. No. 14/325,398, filed on Jul. 8, 2014, now U.S. Pat. No. 9,477,826, which is hereby incorporated by reference in its entirety.

The above-mentioned U.S. patent application Ser. No. 14/325,398 claims priority and benefit from U.S. provisional patent application No. 61/843,915, filed on Jul. 9, 2013, which is hereby incorporated by reference in its entirety.

The above-mentioned U.S. patent application Ser. No. 14/325,398 is a Continuation-in-Part (CIP) of U.S. patent application Ser. No. 13/922,271, filed on Jun. 20, 2013, now U.S. Pat. No. 8,938,787, which is hereby incorporated by reference in its entirety.

The above-mentioned U.S. patent application Ser. No. 14/325,398 is a Continuation-in-Part (CIP) of U.S. patent application Ser. No. 13/877,676, filed on Apr. 4, 2013, now U.S. Pat. No. 9,069,942; which was a National Phase of PCT International Application number PCT/IL2011/000907, filed on Nov. 29, 2011; which claimed priority and benefit from U.S. provisional patent application No. 61/417,479, filed on Nov. 29, 2010; all of which are hereby incorporated by reference in their entirety.

The above-mentioned U.S. patent application Ser. No. 14/325,398 is a Continuation-in-Part (CIP) of U.S. patent application Ser. No. 14/320,653, filed on Jul. 1, 2014, now U.S. Pat. No. 9,275,337, which is hereby incorporated by reference in its entirety.

The above-mentioned U.S. patent application Ser. No. 14/325,398 is a Continuation-in-Part (CIP) of U.S. patent application Ser. No. 14/320,656, filed on Jul. 1, 2014, now U.S. Pat. No. 9,665,703, which is hereby incorporated by reference in its entirety.

The above-mentioned U.S. patent application Ser. No. 15/422,479 is also a Continuation-in-Part (CIP) of U.S. patent application Ser. No. 15/210,221, filed Jul. 14, 2016, now U.S. Pat. No. 9,674,218, which is hereby incorporated by reference in its entirety.

The above-mentioned U.S. patent application Ser. No. 15/210,221 is a Continuation of U.S. patent application Ser. No. 14/675,768, filed on Apr. 1, 2015, now U.S. Pat. No. 9,418,221, which is hereby incorporated by reference in its entirety.

The above-mentioned U.S. patent application Ser. No. 14/675,768 claims priority and benefit from U.S. provisional patent application No. 61/973,855, filed on Apr. 2, 2014, which is hereby incorporated by reference in its entirety.

The above-mentioned U.S. patent application Ser. No. 14/675,768 is a Continuation-in-Part (CIP) of, and claims priority and benefit from, U.S. patent application Ser. No. 14/566,723, filed on Dec. 11, 2014, now U.S. Pat. No. 9,071,969; which is a Continuation of U.S. patent application Ser. No. 13/922,271, filed on Jun. 20, 2013, now U.S. Pat. No. 8,938,787; which is a Continuation-in-Part (CIP) of U.S. patent application Ser. No. 13/877,676, filed on Apr. 4, 2013, now U.S. Pat. No. 9,069,942; which is a National Stage of PCT International Application number PCT/IL2011/000907, having an International Filing Date of Nov. 29, 2011; which claims priority and benefit from U.S. provisional patent application No. 61/417,479, filed on Nov. 29, 2010; all of which are hereby incorporated by reference in their entirety.

FIELD

The present invention is related to electronic devices and computerized systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking website.

SUMMARY

The present invention may include, for example, systems, devices, and methods for detecting identity of a user of an electronic device, for determining whether or not an electronic device is being used by a fraudulent user, and/or for differentiating or distinguishing between (or among) users of a computerized service or between (or among) users of an electronic device.

Some embodiments of the present invention may generate or create a behavioral cookie, or a behavioral-based cookie, or biometric cookie, or a biometric behavioral cookie, or a biometric-and-behavioral cookie; which may enable devices and systems to identify and/or track a user across multiple websites and/or web-pages and/or applications and/or platforms and/or devices, based on behavioral profile and/or behavioral signature and/or behavioral features and/or behavioral characteristics that are derived or deduced or extracted from unique characteristics of user interactions via one or more input units of an electronic device (e.g., touch-screen, keyboard, mouse, touch-pad, or the like) which are monitored, tracked and analyzed; including, for example, user interactions during and/or before and/or after regular user interaction with web-pages or applications or GUI elements, and/or user interactions during and/or before and/or after user interactions in response to an input/output abnormality or irregularity or interference or aberration that is injected or added or introduced to a web-page or application or to a regular GUI.

The present invention may provide devices, systems, and methods of generating and managing behavioral biometric cookies. For example, the system monitors user-interactions of a user, that are performed via an input unit of an end-user device; and extracts a set of user-specific characteristics, which are used as a behavioral profile or behavioral signature. The set of user-specific characteristics are further used as a behavioral biometric cookie data-item, allowing the system to distinguish between two human users that utilize the same electronic device; and allowing the system to distinguish between a human user and an automated script. The system further allows creation and utilization of biometric/behavioral cookies or sub-cookies that distinguish among multiple users of the same device and/or of the same subscription account. The system also allows creation of a cross-device behavioral cookie, to track browsing history of a single user across multiple electronic devices.

The present invention may provide other and/or additional benefits or advantages.

DETAILED DESCRIPTION OF THE PRESENT INVENTION

Figure 1:
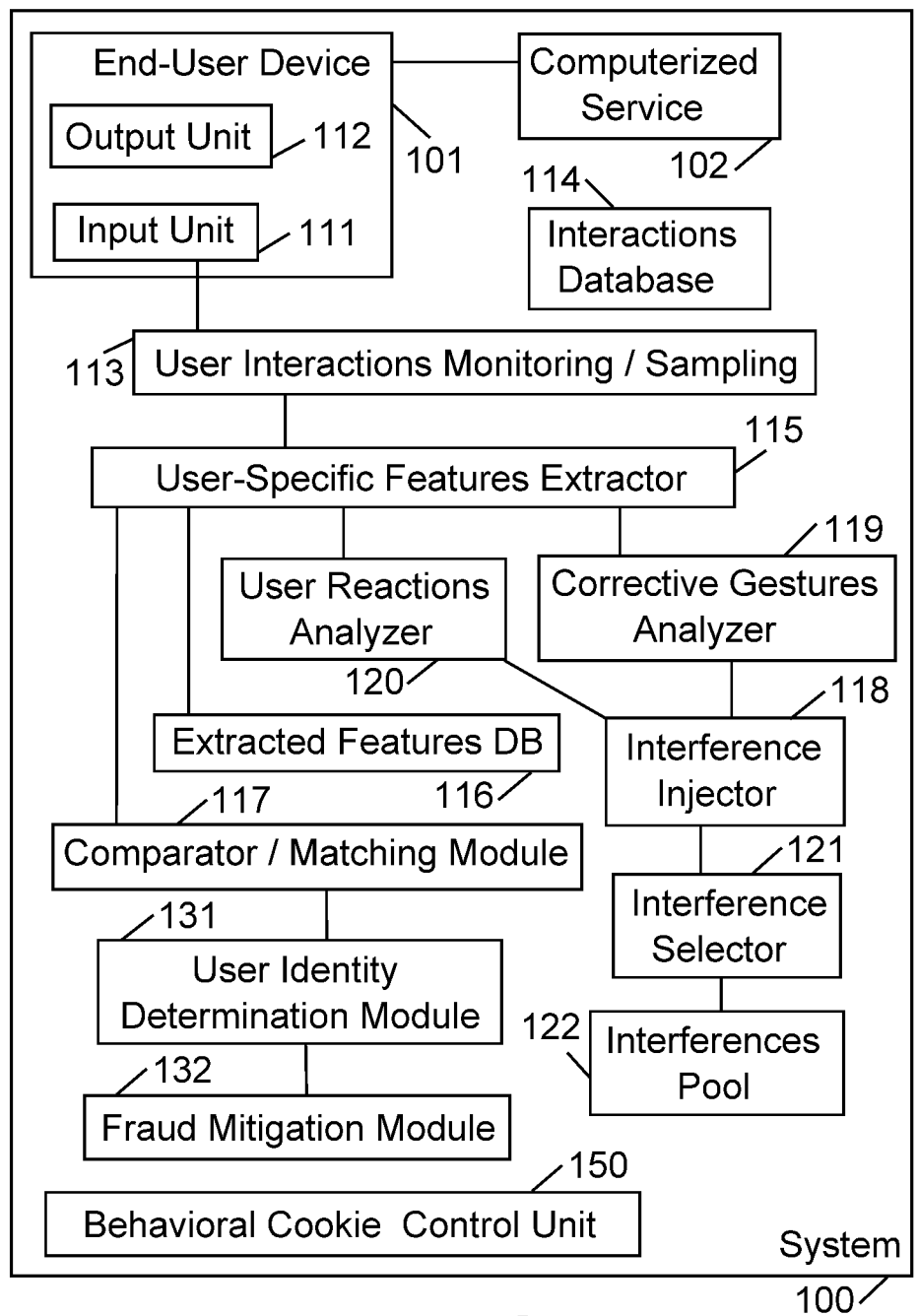
FIG. 1 is a schematic block-diagram illustration of a system, in accordance with some demonstrative embodiments of the present invention.

Applicants have realized that a conventional "cookie", which is used by many web-browsers and computerized systems, may suffer from various disadvantages.

The term "cookie" as used herein may include a data-item or file that is known as "cookie" or "HTTP cookie" or "web cookie" or "Internet cookie" or "browser cookie"; which is sent from a website (or from a web server) to an end-user device (e.g., a computer, a smartphone, a tablet). The cookie is stored locally on the end-user device, typically identifying the end-user device with a unique identification number or string. Subsequently, upon a subsequent visit to the same website, the website may receive from the browser the content of such previously-stored cookie; and the website may thus determine previous browsing activities of the end-user device. The cookie may allow a website, or a set of interconnected websites, to save the state of the end-user device across multiple web-pages (e.g., while the user is adding items into a virtual shopping cart); and to track to some extent the browsing history of a particular browser of a particular end-user device.

The term "user interactions" as used herein may comprise, for example, manual gestures or operations performed by a user by utilizing an input unit of an electronic device; including such gestures and/or operations performed during an on-screen interaction that the user is controlling, and optionally including gestures and/or interactions performed by the user immediately-prior to (or shortly prior to) the actual on-screen interaction, and optionally including gestures and/or interactions performed by the user immediately-subsequent to (or shortly subsequent to) the actual on-screen interaction. The term "user interactions" may further include one or more parameters of the end-user device or the electronic device, during (or immediately before, or immediately after) the actual user interaction; for example, accelerometer data, gyroscope data, device-orientation data, device-positioning data, device angular tilt data (e.g., is the device horizontal or vertical or slanted relative to the ground), device rotation or spinning data (e.g., is the device being rotated clockwise or counter-clockwise, during or before or after the actual user interaction); and/or other information related to the user interaction, or related to a property or to attributes of the end-user device during (or before, or after) the actual interaction performed by the user.

Applicants have realized that a conventional "cookie", which is used by many web-browsers and computerized systems, may suffer from various limitations or disadvantages; and may not provide reliable or precise user-tracking at all times.

Applicants have realized that a cookie data-item or cookie file, or an entirety of cookies stored locally on an end-user device, may be deleted or removed by an end-user; for example, by commanding his web-browser to "clear history" and particularly to clear or delete or remove cookies, or all cookies, or cookies that were stored and/or updated in the past seven days or a certain time-period, or the like. The ability of the end-user to easily delete cookies, reduces or hinders or damages the ability of a website or a remote service to rely on such client-side cookies for complete and reliable user tracking. Particularly, the ability of the user to easily delete a cookie (or all cookies), allows the user to easily present a representation as if the user has never visited a particular website or web-page, or as if the user is a newly-visiting or never-before-visiting user to a particular website or web-page.

Applicants have further realized that a user may command his web-browser to disable the utilization of cookies (entirely, or partially), thereby presenting new obstacles for websites to track the browsing history of users, or to measure the correct number of "unique visitors" or "unique users" of a website.

Applicants have further realized that a user, particularly a sophisticated user, may manually edit the content or the payload of a locally-stored cookie; thereby enabling the use to inject data into a conventional cookie, or to remove data from a conventional cookie, or to edit data within a conventional cookie. For example, a conventional cookie may store in plaintext a representation of "prior-visits=37", indicating that the user has visited this website 37 times so far; and the user may manually edit the cookie content to be "prior-visits=4", to represent as if the number of prior visits was only 4 and not 37.

Applicants have further realized that a cookie file may be copied or duplicated or stolen, by the end-user or by a fraudulent user or imposter, from a first computing device to a second computing device; thereby causing a website or web-page to determine, incorrectly, that the two computing devices are the same single device, and/or thereby causing a website or web-page to determine, incorrectly, that the two users (of the two computing devices) are the same user.

Applicants have further realized that a cookie is browser-specific, and thus some websites or web-pages or computerized systems may incorrectly compute or estimate or measure the number of their "unique users" or "unique visitors". For example, user Adam may utilize a laptop computer running, and may alternately use Internet Explorer web-browser, FireFox web-browser, and Chrome web-browser, in order to access the same website; each one of the web-browsers stores locally its own cookie, and thus the web-server of that website may incorrectly measure as if three different unique users or three different unique visitors have visited the website, instead of a single user. The problem might be partially mitigated if the determination of unique visitor also takes into account the Internet Protocol (IP) address that is associated with each visit; however, this mitigation fails if the same single user Adam visits the same website using different browsers from different locations (e.g., from his home network; from his work network; and from a coffee-shop that offers free public wireless connection).

Applicants have further realized that conventional cookie systems fail to track a user, or fail to continue to track a user, once a user utilizes two or more electronic devices. For example, user Bob may utilize his home computer to browse a website; user Bob may also utilize his work computer to browse the same website; and the website may not be able to link between the two usage-sessions, and may regard these two usage-sessions as two separate "unique visitors", since those visits were performed by different devices (and typically from different IP addresses).

Applicants have further realized that conventional cookie systems fail to continuously track a user, if the user upgrades his software, or upgrades his hardware, or changes his software and/or hardware. For example, when user Carl upgrades his laptop computer from Windows 7 to Windows 10, his entire cookie history may be deleted, thereby disposing of previously-recorded browsing history or tracking data that was accumulated. Similarly, if user David discards his old laptop computer, and purchases and starts using a new laptop computer, the entire browsing history of user David is lost, and a new browsing history is commenced on the new laptop, as if the user David has never visited any website(s) in the past.

Applicants have further realized that conventional cookie systems fail to differentiate among users that belong to the same family or house-hold. For example, a family-room laptop computer may have a single web-browser installed, and may be used by multiple family members (e.g., a mother age 45, and a daughter age 15); the conventional cookie system may incorrectly regard both of these users as the "same user", and may track them as if a single user ominously utilizes that single laptop. This may result in an incorrect measurement of "unique visitors" to a website; since in reality, two (or more) different family-members may visit the same website, while a single cookie reflects that a single user visited the website. Additionally or alternatively, this may cause incorrect tracking of browsing history or browsing habits, and may lead a website or an advertisement server to serve "incorrect" banner advertisements; for example, the daughter may browse a website that sells toys; the mother may use the same computer to browse a website that sells furniture; and during a subsequent browsing session of the daughter, the website may determine that the same user is currently visiting and may thus select and present a banner advertisement for furniture, even though it is the daughter who is currently browsing and not the mother. Additionally or alternatively, privacy of users may be compromised, for example, if the mother is browsing a website in order to buy a surprise gift to her daughter; and later the daughter browses via the same computer and sees a tailored advertisement that hints to the browsed "gift item" which the mother had viewed previously.

Applicants have realized that conventional systems, including online marketing systems and online advertising systems, fail to adequately differentiate among multiple human users that utilize the same electronic device (e.g., the same laptop computer) at different time-slots to access the same website (or, to access different websites). For example, user Adam may utilize the Chrome browser of his household laptop to read an article about dogs on the website of CNN.com; and an hour later, his wife Eve may utilize the same household laptop and the same browser to browse the website of ABC.com, which may incorrectly deduce that she is Adam (e.g., based on a third-party cookie from an advertising network) and may thus serve and present to Eve a tailored advertisement about dog-food even though Eve has never shown any interest in this topic, based on her husband's prior browsing of that topic via the household computer. This incorrect selection of advertisement has various implications, for example: (a) incorrect and/or excess billing towards the Advertiser, who intended to pay only for tailored placement of dog-food ads to users that have actually read article(s) about dogs; (b) presenting to the user Eve an advertisement that is irrelevant to her preferences; (c) exposing to the user Eve a hint about the interests or preferences of user Adam, and potentially breaching his privacy.

Applicants have further realized that conventional systems' attempt to uniquely identify users or visitors, suffer from various problems or deficiencies, for example: security problems, stolen identity, stolen credentials, new account fraud, Account Take-Over (ATO) fraud; incorrectly keeping a new user as logged in to a previous-user's logged-in session; hacks into authentication cookies; online reputations problems; utilization of fake identity (e.g., on social media platforms; in review-based services or retailers); fake reputation, fake credibility (e.g., in on-demand marketplaces such as AirBNB, Uber, KickStarter, crowd-funding systems); incorrect utilization of (or, ignoring of) user preferences, when one device is utilized by multiple different human users; inability to correctly track a user that switched from a first device to a second device, or that upgraded his device, or that switched browsers or "apps"; low accuracy of predicting user preferences based on past browsing; and/or other deficiencies.

Applicants have realized that there is a need to re-define the concept of "unique user" or "unique visitor", in a manner that allows a computerized system or a web server or a remote service, for example: (a) to correctly distinguish among family-members or among members of the same house-hold, that utilize the same computing device; and/or (b) to correctly link between a single user who utilizes a first device and also a second device; and/or (c) to correctly link between a single user who utilizes a first web-browser and also a second web-browser; and/or (d) to correctly and continuously track a single user who upgrades his device, his software and/or his hardware, or who exchanges a device or switches from a first device to a second device; and/or (e) to correctly measure or identify "unique visitors" or "unique users", even if a cookie is erased, or duplicated, or copied, or stolen; and/or (f) to correctly and continuously track the same user, even if he utilizes different browsers and/or different devices and/or different IP addresses, and even if he disabled cookies and/or erased cookies and/or edited cookies and/or copies cookies.

It is clarified that some embodiments of the present invention may solve or address or mitigate one or more, or some, or all, of the above-mentioned problems; and that some embodiments of the present inventions may reach or may enable reaching one or more, or some, or all of the above-mentioned goals or advantages. However, these are only non-limiting examples; and the present invention may solve other problems, or may reach other goals, or may enable other benefits and advantages.

In accordance with the present invention, an end-user device is utilized in order to browse the Internet or the World Wide Web, or in order to access or browse a website or web-page or web-application, or a set of websites that may not necessarily be linked to each other, or that may not be owned or controlled by the same entity. The user of the end-user device utilizes an input unit (e.g., touch-screen, keyboard, mouse, touch-pad, or the like) in order to interact, browse, and perform various operations.

In accordance with the present invention, a tracking module may monitor the interactions of the end-user; including his "native" or "natural" interactions that he performs while browsing a website, and optionally also his "interfered" interactions that he performs in reaction to an interference (or anomaly, or aberration, or disruption) that may optionally be introduced to or injected to a website or a web-page. The tracking module may extract unique user-specific features that characterize the user's interactions, in a manner that allows the system to distinguish among multiple users of the same device, and/or in a manner that allows the system to link between two usage-sessions that the same single user performed utilizing two different end-user devices.

In a demonstrative embodiments, the tracking module may detect and determine that a first set of usage-sessions of web-browsing from a laptop computer, are characterized by the following characteristics: (a) the user clicks an on-screen "submit" button using a mouse-cursor, rather than by pressing the "Enter" key on the keyboard; and (b) the user scrolls down in a long webpage by using the mouse-wheel. The tracking module may further detect and determine that a second set of usage-sessions of web-browsing, from the same laptop computer (e.g., based on identifying the same IP address, and the same "conventional HTTP cookie"), are characterized by the following characteristics: (A) the user does not click on an on-screen "submit" button, but rather, the user submits an online form by pressing the "Enter" key on the keyboard; and (B) the user does not scroll down in a long webpage by using a mouse-wheel, but rather, by using the "Arrow Down" key on the keyboard. Accordingly, the tracking module may determine that the first set of usage-sessions are associated with User A, and the second set of usage-sessions are associated with User B, who utilize the same end-user device.

The system may utilize this differentiation between the two users, for marketing or advertising purposes. For example, the system may mark, each web browsing data, with an indicator of which type of characteristics is associated with that usage-session. In a subsequent usage session, the tracking module may monitor fresh interactions of the current user; and may determine whether they match the previously-detected set of characteristics that characterize User A or User B. The system may determine that the current user exhibits user interactions that match those that were previously-tracked for User B; and the system may now present to the user (who is estimated to be User B, and not User A), only advertisements (or other tailored content) that are selected based on the browsing history of User B, while ignoring the browsing history that was associated by the system with User A.

Optionally, the system may define "sub-cookies" or "secondary cookies", in order to distinguish among multiple users of the same end-user device. For example, in the above scenario, a first HTTP cookie may be generated and written and stored and read to identify and to track "device 1, human user A"; and a second, different, HTTP cookie may be generated and written and stored and read to identify and to track "device 2, human user B".

In another example, the same user, denoted User C, may be detected based on his unique user-specific interactions, across multiple browsers and/or devices and/or locations. The interactions of user Edward when he utilizes his laptop computer at home, and the interactions of the same user Edward when he utilizes his desktop computer at work, may exhibit the same set of user-specific characteristics, that enable a web-server or an advertising-server to determine that the same user (user Edward) is the same human user that operates both of these devices. This may enable the system to take into account the combined or aggregated browsing history across the multiple devices or locations, in order to measure "unique visitors" or in order to select appropriate advertisement content to that user. For example, a web-server may select to present to user Edward, when he is browsing the Internet at work, an advertisement banner that is selected based on the same user's browsing history performed on this home laptop computer; based on the match that was determined between the user-specific characteristics of user interactions. Optionally, two "linked HTTP cookies" may be created or used, across the two different devices: a first cookie to track and reflect the browsing activity of "User E on Device 1", and a second cookie to track and reflect the browsing activity of "User E on Device 2". The system or web-server or ad-server may utilize the linkage between the two separate cookies; and may take into account both cookies, or only one of them, for the purpose of selecting advertisements or selecting content for serving.

In yet another example, the tracking module may differentiate between: (a) a human user who performs manual interactions that exhibit a first set of user-specific attributes; and (b) an automatic script or a "bot" or an emulated user or a simulated user, which is a non-human script or program that performs automated browsing and automated operations, which exhibits a second set of user-specific attributes. The two different "users" may be detected and differentiated, even if performed from the same end-user device, via the same browser, and/or from the same IP address; thereby enabling the system to create and use two different cookies or sub-cookies: a first cookie to reflect the browsing activities of "Device 5, human user A"; and a second cookie to reflect the browsing history of "Device 5, automated user B". The system may then rely on this differentiation, for various purposes, including for advertising purposes, for example, (a) in order to present advertisements only during fresh browsing sessions that exhibit user interactions characteristics that match those of "human user A"; (b) to not present advertisement during fresh browsing sessions that exhibit user interactions characteristics that match those of "automated user B"; (c) to determine or to estimate "click fraud" or fraudulent clicking on advertisements if they are performed during browsing sessions that are associated with "automated user B" and not with "human user A"; (d) to tailor or to select content or advertisements, only based on browsing history that is associated with the "human user A", while disregarding the browsing history that is associated with the "automated user B"; or the like. It is noted that "click fraud" on advertisements, or distinguishing between the human user and the automated script or "bot", may be based on one or more characteristics of user interactions; for example, a human user typically clicks on an advertisement while also concurrently moving the on-screen pointer (e.g., the mouse-click is simultaneous with mouse-dragging), whereas an automated script typically clicks on an advertisement as a discrete mouse-event that is not simultaneous with mouse-movement or mouse dragging; in another example, a human user typically clicks on an advertisement and then, once the landing page loads, moves the on-screen pointer, whereas when an automated click-bot script is used, a click on an advertisement is not followed by pointer movement within the landing page. Other suitable characteristics may be used.

In accordance with the present invention, a "behavioral cookie" or "biometric cookie" may thus be generated, written, read, stored, sent, received, and modified; and such cookie may be utilized for various purposes, for distinguishing among users, for combining or aggregating browsing-history of a user across multiple devices, for tailoring or selecting content (e.g. advertisements) based on biometric and behavioral user differentiation (in addition to, or instead of, utilizing a "conventional HTTP cookie" for tracking browsing history); for differentiating between a human user and an automated script or "bot" or "click-bot"; and/or for other purposes.

In some embodiments, the behavioral cookie or the biometric cookie of the present invention may further be used in order to create, generate and/or introduce new user-profiling data, that an advertising server or an ad exchange system may take into account when selecting an appropriate advertisement for a user. For example, the tracking module may track the user interactions of User A, and may detect that these interactions exhibit a high level of proficiency that is typically attributed to a "power user" or an experienced use (e.g., moving between form fields by using the Tab key and not by mouse-clicks; using keyboard shortcuts to perform operations; using advanced keyboard shortcut that are generally less-known to the general population of users; selecting all text in a field by using CTRL-A keyboard shortcut, and not by marking the text with the mouse). The tracking module may thus determine that the user is a proficient user or an experienced user; and may store a flag or indicator about this trait within the "behavioral cookie", or may otherwise convey this information to an ad server or to an ad exchange; which in turn may utilize this additional information in order to select an advertiser who caters to this type of users (e.g., a vendor of new high-end electronic gadgets that are typically purchased by such "power users" and not by novice users); or, the ad server or ad exchange may take this information into account, in order to un-select or to discard an advertisement or a type of advertisement (e.g., avoiding to select an advertisement for a book that teaches word processing skills to novice users).

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a notebook computer, a desktop computer, a cellular phone, a smart-watch (e.g., Apple iWatch), a fitness bracelet (e.g., similar to FitBit or JawBone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like.

In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser). In some embodiments, a "computerized service" is (or comprises) a web-page or web-site that is being accessed over an Internet connection, and/or other content that may be consumed or accessed via a web-browser. In some embodiments, a "computerized service" is (or comprises) a mobile application or "app" or a native "app" that is installed and/or running on an electronic device (e.g., a smartphone, a tablet, a smart-watch). In some embodiments, a "computerized service" may comprise both website(s) and mobile application(s). In some embodiments, a "computerized service" may be a group or batch or set of websites, particularly a group of websites providing a similar service or the same service (e.g., a "computerized service" being a group of banking websites that provide banking services to consumers, even if owned and/or operated by different banks). In some embodiments, a "computerized service" may be a group or batch or set of "apps" or mobile applications, particularly a group of apps providing a similar service or the same service (e.g., a "computerized service" being a group of banking "apps" that provide banking services to consumers, even if owned and/or operated by different banks).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

In accordance with the present invention, system 100 may comprise a Behavioral Cookie control module or control unit, or a Biometric Cookie control module or control unit, or a Behavioral Biometric Cookie control module or control unit; for example, a Behavioral Cookie control unit 150, which may be able to create, generate, read, write, store, edit, modify, send and/or receive a "cookie" or other or similar data-item or piece-of-data, which may be similar to an HTTP cookie but may allow further differentiation among users and/or improved tracking of users, as described above and/or herein.

Figure 2:
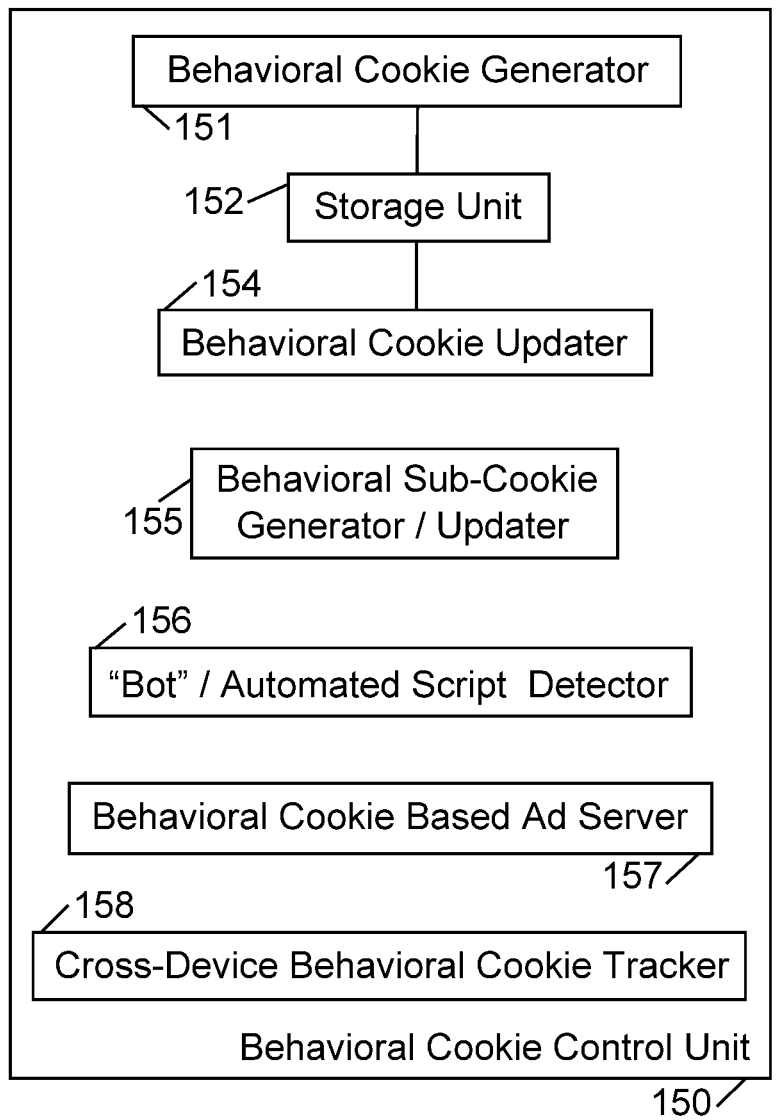
FIG. 2 is a schematic block-diagram illustration of a Behavioral Cookie control unit and its associated components, in accordance with some demonstrative embodiment of the present invention.

Reference is made to FIG. 2, which is a schematic block-diagram illustration of a Behavioral Cookie control unit 150 and its associated components, in accordance with some demonstrative embodiment of the present invention. It is noted that the components of Behavioral Cookie control unit 150 may be client-side components and/or server-side components; may be implemented by using client-side (end-user device) components and/or server-side components, local components and/or remote components. One or more of the tasks or operations of Behavioral Cookie control unit 150 may be performed locally within the end-user device; one or more of the tasks or operations of Behavioral Cookie control unit 150 may be performed remotely by a server or web-server or application-server or advertising server or an Ad Exchange server or system; one or more of the tasks or operations of Behavioral Cookie control unit 150 may be performed by utilizing both local (end-user device) operations as well as remote (server side) operations.

Behavioral Cookie control unit 150 may comprise a behavioral cookie generator 151, able to create and/or generate and/or write and/or store and/or send a cookie (or a data-item) that reflects user-specific input-unit interactions that are attributed to a particular user of an end-user device (or, to a particular user of a browser; or to a particular user of a computerized service). Fr example, the characterizing behavioral profile or behavioral signature, or a data-set of behavioral features, that are extracted from monitored user interactions via the input unit(s), or a representation thereof (e.g., an encoded version, a hashed version, a shortened version), may be the payload or the content of such Behavioral Cookie.

In a first example, the behavioral cookie generator 151 may be a server-side component, which receives from a web-browser (e.g., via JavaScript or HTML5 or other mechanisms) indications or representations of raw data that reflects user interactions; and calculates or determines from such raw data the user-specific attributes of interactions, which are then written as payload of a Behavioral Cookie that is sent to the browser of the end-user device; and which is also stored in a server-side database.

In a second example, the behavioral cookie generator 151 may be a server-side component, which receives from a web-browser (e.g., via JavaScript or HTML5 or other mechanisms) indications or representations of partially-processed data or fully-processed data that reflects user interactions, after such processed data was already prepared on the end-user device (e.g., by using a local plug-in or extension or JavaScript or HTML5 or the like); and the server-side behavioral cookie generator 151 packages the processed data as a payload of such Behavioral Cookie that is sent back to the browser of the end-user device; and which is also stored in a server-side database.

In a third example, the behavioral cookie generator 151 may be (or may comprise) a client-side component, which may be able to locally generate some or all of the user-specific characteristics of the end-user that interacts with the computerized service; and may store the Behavioral Cookie information locally, directly and immediately, and/or may send the Behavioral Cookie information to a remote server (e.g., to the web-server that serves the current website; or to an Ad Exchange server), for remote storage there and/or (optionally) for a redirected cookie-write request from the remote server towards the local browser.

The Behavioral Cookie may be stored locally in a local storage unit 152 of the end-user device. Additionally or alternatively, the Behavioral Cookie (or a copy thereof; or a copy of the content or payload of the Behavioral Cookie) may be stored remotely, on a remote server, a web server, and as server, and/or an Ad Exchange server.

A Behavioral Cookie updater 154 may further operate, to update, modify and/or edit the content or the payload of the Behavioral Cookie, based on updated or fresh user interactions that are analyzed for extraction of user-specific characteristics. The updating of the Behavioral Cookie may be performed continuously or substantially continuously; or may be performed at pre-defined time intervals (e.g., every minute, every hour, every day, every week); or may be performed upon a triggering event (e.g., the user closed the browser window, or the user has commanded to exit the browser), or if a pre-defined condition holds true (e.g., if a threshold number of user interactions has been monitored and/or has been analyzed; or if a threshold number of user-specific characteristics have been extracted). The updating of the payload or the content of the Behavioral Cookie may be performed locally (e.g., in the locally-stored Behavioral Cookie) and/or remotely (e.g., at a remote repository or server that stores copies of such Behavioral Cookies).

Optionally, a Behavioral Sub-Cookie generator/updater 155 may operate in order to distinguish between or among two or more users who utilize the same end-user device, based on behavioral traits of their user interactions. For example, the Behavioral Sub-Cookie generator/updater 155 may detect or determine that a first set of user interactions (or a first usage session) belongs to User A based on a first behavioral biometric profile; and may detect or determine that a second set of user interactions (or a first usage session) belongs to User B based on a second behavioral biometric profile. Accordingly, the Behavioral Sub-Cookie generator/updater 155 may generate (and may later update or modify) a first Behavioral Sub-Cookie, which stores data reflecting only the browsing history that is associated with User A and his user-specific traits; and may also generate (and may later update or modify) a second, different, Behavioral Sub-Cookie, which stores data reflecting only the browsing history that is associated with User B and his user-specific trait. The Behavioral Sub-Cookie may be stored locally (on the end-user device), and/or remotely (e.g., at a web server, advertising server, Ad Exchange server). This may enable the system to generate a first behavioral sub-cookie for tracking the browsing history of "Device 123456, human user A"; and to generate a second behavioral sub-cookie for separately tracking the browsing history of "Device 123456, human user B".

Optionally, a "bot"/automated script detector 156 may operate to detect or to estimate that one or more user interactions, or sets or sessions of user interactions, are associated with "bot" behavior or automated script behavior, rather than with human user interaction or manual user interactions; and may convey a "bot"/automated script detection signal to the Behavioral Sub-Cookie generator/updater 155, which in turn may generate a suitable Behavioral Sub-Cookie to separately track the browsing history or browsing activity of "Device 123456, automated user C".

In some embodiments, a Behavioral Cookie based Ad Server 157 (or Ad Exchange sub-system) may operate in order to track the browsing activity or browsing history of users to which a Behavioral Cookie was generated; and in order to select and/or create user-specific content, particularly a tailored advertisement or tailored promotional content, based on the distinct browser history that is reflected in a Behavioral Cookie or in a Behavioral Sub-Cookie.

In a first example, the Behavioral Cookie based Ad Server 157 may receive a signal from the end-user device, that the current fresh user-interactions of a currently-browsing user, match the user-specific characteristics of "Device 123456, User A"; and may tailor or select an advertisement based on the browsing history associated with that "User A", and not with "User B" (an additional human user who utilizes the same end-user device), and not with "User C" (an automated script that performs automated browsing/clicking activity via the end-user device of User A).

In a second example, the Behavioral Cookie based Ad Server 157 may receive from the end-user device only raw or partially-processed data with regard to the fresh or current user interactions of the current user who is currently browsing or accessing a website or a webpage; and the Behavioral Cookie based Ad Server 157 may perform a server-side matching or a server-side decision in order to determine whether the fresh user-interactions, or their signature or their hash or their other representation or summarization, match more closely the human "User A" or the human "User B" or the automated "User C"; and the Behavioral Cookie based Ad Server 157 may then tailor or select the advertisement content based on the browsing history segment that is associated with that particular user or "sub-user", as indicated by the Behavioral Cookie and/or by any Behavioral Sub-Cookies.

In some embodiments, a cross-device Behavioral Cookie tracker 158 may track the browsing history or browsing history of a particular human user across multiple end-user devices and/or multiple IP-addresses and/or multiple browsers; based on unique user-specific traits that are extracted from user-interactions of that user across such different devices, browsers and IP-platforms. For example, the cross-device Behavioral Cookie tracker 158 may be a server-side component that may analyze multiple Behavioral Cookies that were generated by multiple devices and/or by multiple browsers (e.g., and from different IP addresses); and may search and detect a particular Behavioral Profile or Behavioral Signature or behavioral data-set of attributes, that is exhibited in two or more such Behavioral Cookies. The cross-device Behavioral Cookie tracker 158 may then deduce or determine that all these (two or more) Behavioral Cookies belong to (or reflect) the same human user, or reflect the behavioral traits of a single human user who utilized multiple devices and/or multiple browsers and/or multiple IP addresses. The cross-device Behavioral Cookie tracker 158 may generate a Behavioral Cross-Device Cookie, which may be stored in a remote server or remote repository (e.g., ad serer, Ad Exchange server, a "big data" repository, a web server); and which may aggregate or may accumulate therein the browsing data or browsing history or browsing activity from both (or from the multiple) Behavioral Cookies that were generated from different multiple devices. Optionally, the Behavioral Cross-Device Cookie may be sent back to each one of these multiple devices of the common user; or may be stored also locally in each one of these multiple devices of the common user. The Behavioral Cross-Device Cookie may be used by an Ad Serve or an Ad Exchange in order to select or allocate or create a content-item (e.g., an advertisement) based on the aggregated browsing history of that user across multiple devices. In some embodiments, the Behavioral Cross-Device Cookie may enable the system to generate or select an Advertisement, for User A when he utilizes Device 1 for browsing, based on historic browsing activity that the same User A performed in the past when he utilized Device 2 for browsing.

Figure 3:
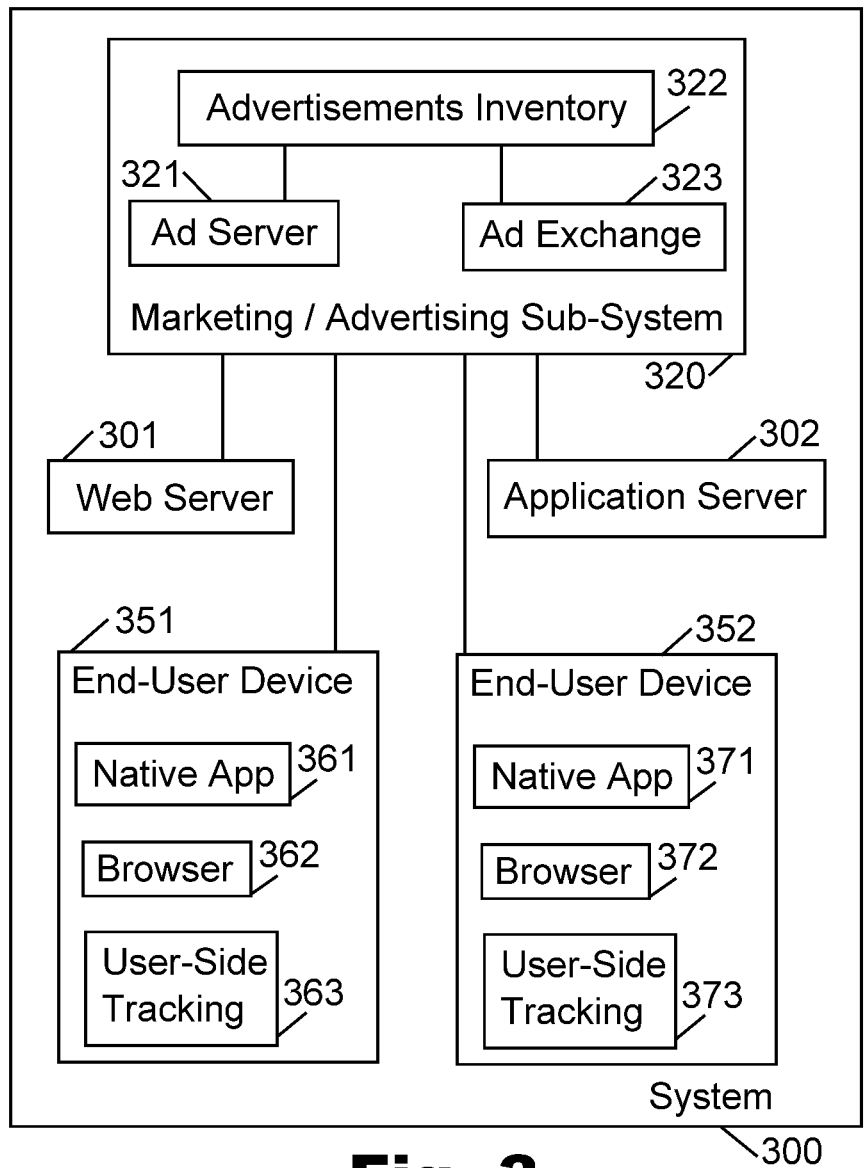
FIG. 3 is a schematic block-diagram illustration of a tracking and digital marketing system, in accordance with some demonstrative embodiment of the present invention.

Reference is made to FIG. 3, which is a schematic block-diagram illustration of a tracking and digital marketing system 300, in accordance with some demonstrative embodiment of the present invention. The components of system 300 may be implemented on end-user devices and/or server-side devices, by utilizing suitable combinations of hardware units and/or software units.

System 300 may comprise one or more end-user devices, for example, an end-user device 351 and an end-user device 352. Each one of end-user devices 351 and 352 may be or may comprise, for example, a smartphone, a tablet, a laptop computer, a desktop computer, a smart-watch device, a digital fitness bracelet or watch or device, a wearable or portable electronic device or mobile device, an Augmented Reality (AR) device, a Virtual Reality (VR) device, a vehicular component or vehicular device, or the like.

End-user device 351 may comprise, for example, a native application 361 which may be locally installed thereon; and/or a web browser 362 able to access, download, parse and display web content or served content.

Similarly, end-user device 352 may comprise, for example, a native application 371 which may be locally installed thereon; and/or a web browser 372 able to access, download, parse and display web content or served content.

System 300 may further comprise a web-server 301 able to serve a website, web-pages, and/or other Web content (e.g., over HTTP and/or HTTPS and/or other suitable protocols) to end-user devices 351-352. System 300 may also comprise an application server 302 to serve and/or to operate an application installed thereon or served by it, or to communicate with a locally-installed application that may be locally installed on end-user devices.

End-user device 351 may further comprise a user-side tracking module 363, for example, implemented as part of native application 361, or implemented as extension or plugin or add-on to web browser 362, or implemented as a script or code (e.g., in JavaScript, in HTML5, or the like) that is otherwise installed on or is able to run on end-user device 351. The user-side tracking module 363 may monitor the user interactions of the user with or via the input unit(s) of end-user device 351; and may extract from them user-specific behavioral characteristics, and/or may generate from them a unique user-specific behavioral profile or behavioral signature; and/or may send or upload data about user interactions to a remote unit, such as to a server-side tracking module 303 which may store the extracted user-specific characteristics and/or profile and/or signature, and/or which may process raw user-interactions data or partially-processed user-interactions data that is received from the user-side tracking module 363 in order to generate from such data (on the server side) a user-specific behavioral profile or signature.

Similarly, end-user device 352 may further comprise a user-side tracking module 373, for example, implemented as part of native application 371, or implemented as extension or plugin or add-on to web browser 372, or implemented as a script or code (e.g., in JavaScript, in HTML5, or the like) that is otherwise installed on or is able to run on end-user device 352. The user-side tracking module 373 may monitor the user interactions of the user with or via the input unit(s) of end-user device 352; and may extract from them user-specific behavioral characteristics, and/or may generate from them a unique user-specific behavioral profile or behavioral signature; and/or may send or upload data about user interactions to a remote unit, such as to the server-side tracking module 303 which may store the extracted user-specific characteristics and/or profile and/or signature, and/or which may process raw user-interactions data or partially-processed user-interactions data that is received from the user-side tracking module 373 in order to generate from such data (on the server side) a user-specific behavioral profile or signature.

System 300 may further comprise a Behavioral Cookies management unit 304, able to generate, update, modify, read, write, send and/or receive a Behavioral Cookie (including also, but not limited to, a Behavioral Sub-Cookie as described above; and/or a Cross-Device Behavioral Cookie as described above).

System 300 may comprise, or may be associated with, a Marketing/Advertising Sub-system 320, which may comprise, for example, an ad server 321, an advertisements inventory 322, an Ad Exchange unit 323, and/or other suitable components. The Marketing/Advertising Sub-system 320 may operate to select content (e.g., digital advertisements), or to adapt or adjust or modify content, optionally in real-time and/or using a mechanism of Real-Time Bidding (RTB) of multiple advertisers (or other demand-side entities) who compete on an advertising space within a web-site or web-page or a native application that is running on end-user devices and/or that is accessible through end-user devices.

In accordance with the present invention, the Marketing/Advertising Sub-system 320 may select, generate, modify and/or tailor content (e.g., an advertisement), that is selectively displayed or served to end-user device 351, and that is not displayed and is not served to end-user device 352, based on the Behavioral Profile that is associated with end-user device 351 (or its current user) and/or based on the Behavioral Profile that is associated with end-user device 352 (or its current user).

In accordance with the present invention, the Marketing/Advertising Sub-system 320 may select, generate, modify and/or tailor content (e.g., an advertisement), based on the payload or the content of a Behavioral Cookie that may be stored in, or associated with, end-user device 351 and/or end-user device 352.

In accordance with the present invention, the Marketing/Advertising Sub-system 320 may select, generate, modify and/or tailor content (e.g., an advertisement), based on the payload or the content of a Behavioral Sub-Cookie that may be stored in, or associated with, end-user device 351 and/or end-user device 352.

In accordance with the present invention, the Marketing/Advertising Sub-system 320 may select, generate, modify and/or tailor content (e.g., an advertisement), based on the payload or the content of a Cross-Device Behavioral Cookie that may be stored in, or associated with, end-user device 351 and/or end-user device 352.

In accordance with the present invention, the Marketing/Advertising Sub-system 320 may select, generate, modify and/or tailor content (e.g., an advertisement), based on multiple parameters, for example: a Behavioral Cookie or Behavioral Sub-Cookie associated with end-user device 351; a Behavioral Cookie or Behavioral Sub-Cookie associated with end-user device 352; a Cross-Device Behavioral Cookie associated with end-user device 351 and/or end-user device 352; a current location of end-user device 351 and/or of end-user device 352 (e.g., determined or estimated based on Global Positioning System (GPS) data, based on cellular triangulation or cellular location estimation, based on Wi-Fi location estimation or Service Set Identifier (SSID), or based on other location-estimation means); data about the type or the attributes of the actual end-user device being used (e.g., screen size, screen resolution, color depth); data about the user of the end-user device as extracted or obtained from a suitable user database, cellular subscriber database, social media or social networking website or database; and/or other suitable parameters.

In some embodiments, the system may utilize, generate, read and/or write the Behavioral Biometric Cookies (or sub-cookies, or secondary cookies, or cookie data-items), locally within the end-user device as client-side cookies and/or remotely at a remote server as server-side cookies; for example, by utilizing a Cookie ID number (or identifier string, or other Global Unique Identifier (GUID) or other unique string), which may link or associate between a behavioral biometric cookie that is stored locally within an end-user device (e.g., through a browser, or through an application cookie) and a record in a remote database that stores (or links to, or points to) a behavioral biometric record or profile or signature that is associated therewith.

In some embodiments, the utilization of behavioral biometric cookies may enable the system to distinguish or to differentiate among two-or-more, or multiple, Anonymous users; or among two-or-more, or multiple, non-logged-in users.

In a first demonstrative example, a new anonymous user (non-logged-in user; non-signed-in user) freshly visits a website or an online service, by utilizing an end-user device running an application (e.g., a web browser, or a native application, or a Web-based application) that does not yet have any previous Behavioral Biometric Cookie. Such "fresh" access by the "fresh" non-logged-in user, may be due to various reasons, for example: (i) because this is the first-ever visit of that user to that website or online service which utilizes the system of the present invention; or (ii) because this is a repeat visit of a user who performed "delete history" or "erase all cookies" from his end-user device or browser or application, thereby "appearing" to a conventional browser to be a first-time user. In such case, the system monitors the user interactions; generates a behavioral biometric profile or signature or model or data-structure, reflecting the extracted or identified user-specific characteristics; and generating a new Behavioral Biometric Cookie— for example, by storing or writing on the end-user device a Behavioral Biometric Cookie having a particular unique Cookie ID identifier number, and by storing or writing in a remote database, under a record having the same identifier number (or linked to that identifier number) the data indicating that particular behavioral biometric profile or model. Over time, and as more visits to the website or service are performed from the same end-user device, the system may accumulate or may aggregate additional monitored user interactions, and may extract from them additional user-specific traits, which may augment or may update or modify the stored behavioral biometric model. In some embodiments, the subsequent user-interactions that originate from that particular end-user device, may actually be user-interactions of a new user (e.g., a family member of the original user, who uses the family's laptop or tablet); and the system of the present invention may be able to differentiate among multiple anonymous (non-logged-in) users that are sharing the same electronic device at different time-slots, and may optionally generate, store, write and/or read a sub-cookie or a sub-record, or a suitable Tag or other flag or data-item, on the client-side and/or on the server-side, to indicate that this is a secondary user associated with the same device (e.g., a first cookie or sub-cookie or record or sub-record to indicate user interactions of "Unique Identifier 1234567, User A"; and a second cookie or sub-cookie or record or sub-record to indicate user interactions of "Unique Identifier 1234567, User B").

In some embodiments, optionally, the system may compare or analyze user interactions of a new user Bob (or, a new user associated with Cookie ID number 9876543; and over time, may determine that the behavioral biometric model that characterizes those user interactions of the user Bob (or, of the Cookie ID number 9876543) actually match, or are similar or identical to, a previous behavioral biometric model that had previously been extracted with regard to a previous user Adam (or, a previous user associated with Cookie ID number 4564567). Upon such determination, the system may optionally perform one of several suitable determinations or operations. In a first type of operations or determinations, the system may determine (e.g., by examining time-stamps, and examining the time frequency or time intervals of usage sessions), that both users Adam and Bob are still active, and the system may thus unify their browsing history or their usage history under a combined record or cookie, with sub-division or sub-records to indicate that the two different trails of paths of history are associated with two different devices that are utilized interchangeably by the same single human user, for example, the same user who utilizes his tablet (Cookie ID number 9876543) and at other times utilizes his tablet (Cookie ID number 4564567). In a second type of operations or determinations, the system may determine or may estimate (e.g., by determining that the "older" set of user interactions, or the "older" Cookie ID identifier, has not been seen active for several weeks or several months or for a long time), that the two different Cookies reflect the same single human user who switched or changed his end-user device (or, who deleted his previous cookies); and no longer uses his "older" device that was associated with the "older" Cookie ID identifier number; and the system may optionally combine or unify the two Cookies (and/or their respective records, and browsing history) into a single behavioral biometric cookie. In some embodiments, the system may re-examine or re-analyze over time, whether a unification or a combination of two previous records or behavioral biometric cookies, into a single one or unified one, is indeed correct and should be maintained, in view of subsequent user interactions with the website or the online service; and the system may re-estimate from time to time, whether (or, to what extent) new user interactions indeed can be safely attributed to a previously-identified user or usage-session.

In another demonstrative example, an anonymous user (non-logged-in user; non-signed-in user) may access the website or the online service, which in turn may check whether an Behavioral Biometric Cookie already exists for this user (e.g., whether a Behavioral Biometric Cookie is already stored locally in the current end-user device, having a Cookie ID identifier number). If the checking result is positive, then the server may read the content of that locally-stored Behavioral Biometric Cookie, and particularly the Cookie ID number included therein; and may obtain from the remote database the corresponding record, that reflects the user-specific behavioral biometric model (or profile, or signature, or traits) that had previously been extracted from previous user-interactions. The system may proceed to operate in real time, or in near-real-time or substantially in real time (e.g., while the user is still interacting with the online service), in order to monitor the fresh or the current user interactions, and in order to determine in real time whether or not the fresh interactions match the previously-stored Behavioral Biometric Profile that corresponds to the Cookie ID number; or, in some embodiments, to determine in real time, which one of multiple previously-stored Behavioral Biometric Profiles or Models, that had previously been extracted and stored with that same Cookie ID number, is the closest match to the current, fresh, user interactions.

The present invention operates to re-define what is a "unique user" or "unique visitor" of a website or web-page or application or "app" or service or in cyber-space, based on dynamic analysis of user-interaction data via input-units of electronic devices and/or computing devices; in a manner that goes beyond the capabilities of utilizing a conventional HTTP cookie and/or relying on an Internet Protocol (IP) address in order to differentiate among users. The present invention may analyze the user-interaction data, in order to construct a user-specific behavioral profile or signature or "behavioral cookie", which may be stored locally on the end-user device and/or may be stored remotely on a remote server or a "cloud computing" server or database or repository, and/or which may be tracked across multiple different websites and/or web-pages and/or applications and/or "apps" and/or other cyber-space destinations, and across various different devices (e.g., home laptop, work laptop) and/or across multiple different types of devices (e.g., smartphone, tablet, laptop).

The present invention may thus improve and/or enhance the ability of computerized systems to uniquely identify human users that visit online destinations, and/or to correctly differentiate among two (or more) different users even if they utilize the same single device, the same single browser or "app", and/or the same Internet Protocol (IP) address.

In some embodiments, a "user profile" may comprise multiple components or elements or parameters; for example, combined metrics of Device Identifier (Device ID), the IP address, geo-location information of the device (e.g., based on the IP address, based on cellular telephony location data, based on Wi-Fi data, based on available or nearby SSID/network names, or the like) and a set of one or more biometric/behavioral characteristics or features that characterize the user and that are deduced or extracted from user interactions. User interaction and data may be collected via various tools, for example, JavaScript, Flash, Java, HTML5, CSS, a browser extension or add-on or plug-in, a Web application, a module or code which may be part of another "app" or application (e.g., a user-interactions tracking module which may be part of a banking "app" or application or interface), or the like. Optionally, "big data" analysis, as well as cloud-based machine learning (ML) or deep learning (DL) may be used to learn and analyze user interactions, to extract unique user-specific characteristic(s), and/or to construct biometric/behavioral profiles for users. The "biometric/behavioral cookie" may be a client-side cookie and/or a server-side cookie, to identify an anonymous user and/or a logged-in (e.g., already authenticated) user, based on the user's unique behavioral features; and may further include or may point to a unique Universal ID number per each cookie and/or per each user.

The system may operate as a bio-identity bureau or database, able to provide and/or enhance security and/or reputation of users. For example, the system may enable continuous authentication and fraud detection; detection of new account fraud; keeping users logged on, or conversely forcing a log-out or log-off based on different user behavior; logging; authentication cookies without the need to manually credentials; detection of a shared account, which is shared by two or more human users; detection of a fake user profile that illegitimately attempts to gain reputation; credibility check (combined metrics and credibility scores).

Some embodiments may enhance anonymous user preferences, and may allow to perform an "identity zoom". For example, in a website that does not require logging-in to consume content (e.g., CNN.com), browsing sessions may be divided or classified between: (1) sessions performed on Device A, by User 1, which has a user-preference P1; and (2) sessions performed on Device A, by User 2, which has a user-preference P2. Then, in a subsequent usage session, the system may identify user-interactions that indicate that the current user is User 2, and the system may automatically and/or autonomously modify and/or configure the content based on that identification. A similar process may be performed with regard to a website that requires logging-in or authentication in order to consume content or to perform transactions; such as a banking website that a husband and a wife access separately to view their joint bank account; thereby allowing the banking website, based on different user interactions, to distinguish between the husband and the wife even though they may be sharing the same, single, set of log-in credentials.

Some embodiments may then further predict user preferences; for example, by detecting that a current user exhibits user-interactions that have a particular feature, and by determining that this user-specific feature has typically been associated with a particular user-preference, and thus modifying the content presented to the user to accommodate such predicted user-preference. Some embodiments may further identify the same particular human user, across different devices (e.g., two different laptops), and/or across different types of devices (e.g., laptop and smartphone), and/or across different browsers (e.g., Chrome and FireFox), based on his user-specific features which can be extracted from his user-interactions. The biometric/behavioral cookie may be a third-party cookie, which may be written by and/or read by an advertising network manager or an advertising network platform; thereby enabling viral distribution of such cookies, and efficient tracking of users across various websites or online destinations. Optionally, electronic commerce websites, online vendors, online retailers, ad networks, data aggregators, search engines, social media websites, and other venues may distribute and/or may share the behavioral/biometric cookie of a user, and may distribute such cookies to new devices; and may exponentially increase the amount of "anonymous" (not logged-in) biometric-behavioral profiles that the system is able to construct, and may increase the ability to perform Identity-Zoom and Preferences Prediction with regard to (e.g., anonymous) users. Similarly, account-based websites (which require a log-in process) may distribute the behavioral/biometric cookie to current and new devices and users, and may thus increase the amount of "known" biometric-behavioral profiles, and may thus boost the Cross Platform identity capabilities of the system. The system may thus generate hundreds-of-millions of such "behavioral/biometric cookie", associated with not-logged-in users (anonymous users) and associated with logged-in users (known users), across numerous platforms.

Some embodiments may comprise a Forced Log-Out Initiator Unit, which may operate as follows: (a) a user authenticates to a service; (b) the user performs user-interactions, exhibiting a behavioral user-specific feature F1; (c) after twenty minutes, user-interactions no longer exhibit that behavioral user-specific feature F1, and/or, user-interactions commence to exhibit another behavioral user-specific feature F2 that was not observed when feature F1 was observed; (d) based on these detections, the Forced Log-Out Initiator Unit determines that the human user who logged-in, is no longer operating the electronic device, and that a different human user is currently interacting with the logged-in session; and the Forced Log-Out Initiator Unit thus initiates and/or performs a forced log-off or forced log-out of the authenticated session, and/or forced termination of the logged-in session; in order to protect the legitimate user against fraud, and in order to force the current user (who is suspected to be a different user) to actively log-in via authentication credentials in order to continue using the service.

In some embodiments, a method comprises: (a) monitoring user interactions that a user performs via an input unit of an electronic device when using a computerize service/application/website; (b) extracting from said user interactions, a cognitive behavioral biometric model that characterize said user interactions; (c) generating a behavioral cookie that belong to said model, and storing the cookie on said electronic device; (d) storing the model in the cloud or in a remote database or remote server, under the same cookie ID (identifier number).

In some embodiments, the method comprises: (a) when a new usage session is performed with the same behavioral cookie, checking whether the model that belongs to the specific behavioral cookie is similar to the new model that extracted for the new session; (b) if the models are similar or they match, then updating the old model with the fresh data; in contrast, if the models are not similar or do not match, storing the fresh model under the same cookie ID as a different user; (c) with every new usage session, determining whether the new (or current) user is one of the different users that were seen before under the same cookie ID, or whether the current user is a different user that will be add in addition to the older one(s) under the same cookie ID.

In some embodiments, a computerized service/application/website is able to read the behavioral cookie, monitor the fresh (e.g., current, or currently-observed, or recently-observed, or just-observed, or observed in the most-recent N seconds wherein N is smaller than 60 or 30 or 15 or 10 seconds or other threshold value) interactions of the user, and has access to the cloud or the remote server or the remote database in which the models are being stored under each cookie ID; and may determine which one of the different users is currently acting in the current usage session (e.g. User 3 under Cookie number 12345); and based on that determination, may gather or collect different type of data about the specific user, and/or may make different decisions regarding the specific user, such as which advertisement or content-items to select or serve or present.

In some embodiments, the method comprises: (a) if there is no behavioral cookie stored on the electronic device, monitoring user interactions that a user performs via an input unit of an electronic device when using a computerize service/application/website; (b) extracting from said user interactions, a cognitive behavioral biometric model that characterizes said user interactions; (c) checking if the new model is similar to one of the old models that extracted before from session which are similar in their static parameters (e.g., IP address, device identifier, browser type, browser setup, or the like); if it matches, then generate a behavioral cookie and tag it as a continuation or as a potential continuation of the previously-extracted similar model.

In some embodiments, a method comprises: (a) monitoring user interactions that a user performs via an input unit of an electronic device; (b) extracting from said user interactions, a set of user-specific behavioral characteristics that characterize said user interactions; (c) generating a behavioral cookie data-item having a cookie payload that reflects said set of user-specific behavioral characteristics.

In some embodiments, the monitoring of user interactions may be performed internally within the electronic device, and/or may comprise processing or analysis by a remote server.

In some embodiments, the method comprises: (A) sending from the electronic device to a remote server, data reflecting said user interactions that are monitored within the electronic device; (B) wherein said generating of the behavioral cookie data-item, is performed by said remote server based on said data reflecting said user interactions, that the remote server received from the electronic device; (C) sending said behavioral cookie data-item, that was generated on said remote server, to said electronic device; (D) storing within the electronic device said behavioral cookie data-item that was generated on said remote server and that was sent from said remote server to the electronic device.

In some embodiments, the method comprises: (A) sending from the electronic device to a remote server, data indicating said set of user-specific behavioral characteristics that were extracted within the electronic device; (B) wherein said generating of the behavioral cookie data-item, is performed by said remote server, based on said set of user-specific behavioral characteristics that the remote server received from the electronic device; (C) sending said behavioral cookie data-item, that was generated on said remote server, to said electronic device; (D) storing within the electronic device said behavioral cookie data-item that was generated on said remote server and that was sent from said remote server to the electronic device.

In some embodiments, the method comprises: sending at least said payload of the behavioral cookie data-item, to a remote ad server; at said remote ad server, selecting from an inventory of advertisements, a particular advertisement to be served by the remote ad server to the electronic device, based on said payload of the behavioral cookie data-item.

In some embodiments, the method comprises: (d) sending at least said payload of the behavioral cookie data-item, to a remote application server; (e) at said remote application server, selecting from an inventory of advertisements, a particular advertisement to be served by the remote application server to the electronic device, based on said payload of the behavioral cookie data-item.

In some embodiments, the method comprises: sending at least said payload of the behavioral cookie data-item, to a remote ad server; (e) at said remote ad server, selecting from an inventory of advertisements, a particular advertisement to be served by the remote ad server to the electronic device, based on said payload of the behavioral cookie data-item.

In some embodiments, the method comprises: at a remote application server, selecting from an inventory of advertisements, a particular advertisement to be served by the remote application server to the electronic device, based on said payload of the behavioral cookie data-item.

The terms "mobile device" or "mobile electronic device" as used herein may include, for example, a smartphone, a cellular phone, a mobile phone, a tablet, a handheld device, a portable electronic device, a portable gaming device, a portable audio/video player, or the like.

The term "pointing device" as used herein may include, for example, a mouse, a trackball, a pointing stick, a stylus, a joystick, a motion-sensing input device, a touch screen, a touch-pad, or the like.

The term "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, or the like.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

In some embodiments, the present invention may be utilized to decrease (or increase, or modify) friction from an authentication process. For example, after a login form was filled and submitted by the user, a demonstrative system may skip or not skip an additional authentication step (e.g., a security question) if the system recognizes the user as the genuine user.

Some embodiments may identify or detect a remote access attacker, or an attacker or a user that utilizes a remote access channel to access (or to attack, or to compromise) a computerized service.

In some embodiments, a method comprises: (A) monitoring user interactions that a user performs via an input unit of an electronic device, when the user interacts with a computerized service that utilizes communication between said electronic device and a remote server; (B) extracting from the monitored user interactions, a behavioral biometric model that characterize said user interactions; (C) storing in a remote database, that is external to said electronic device, a record indicating (i) the extracted behavioral biometric model of said user, and (ii) a unique identifier; (D) generating, and storing internally within said electronic device, a behavioral biometric cookie data-item that reflects an association between: (I) said user, and (II) said record reflecting the extracted behavioral biometric model that is stored in said remote database; (E) storing said behavioral biometric cookie data-item, internally within said electronic device.

In some embodiments, the storing of step (C) comprises storing in said remote database a behavioral biometric cookie ID number; wherein the storing of step (E) comprises writing internally within said electronic device a client-side cookie that comprises said behavioral biometric cookie ID number.

In some embodiments, the method comprises: (a) in a subsequent usage session of said computerized service, reading from said electronic device the behavioral biometric cookie data-item, and determining a corresponding record in said remote database that corresponds to the content of said behavioral biometric cookie data-item; (b) if fresh user interactions match the previously-extracted behavioral biometric model that is stored in said remote database for said user, then: (i) determining that a current user is same as a previous user that was previously associated with said record, and (ii) updating said record in said remote database, to reflect an updated behavioral biometric model that is based on previous user interactions and also on the fresh user interaction.

In some embodiments, the method comprises: (a) in a subsequent usage session of said computerized service, reading from said electronic device the behavioral biometric cookie data-item, and determining a corresponding record in said remote database that corresponds to the content of said behavioral biometric cookie data-item; (b) if fresh user interactions do not match the previously-extracted behavioral biometric model that is stored in said remote database for said user, then: (i) determining that a current user is a different person relative to a previous user that was previously associated with said record, and (ii) updating said record in said remote database, to reflect that the current user that is currently utilizing said electronic device is different from a previous user that was previously associated with said record, and to further store a secondary record that reflects a freshly-extracted behavioral biometric model that corresponds to the fresh user interactions of said current user.

In some embodiments, the updating of step (b) comprises: storing in the remote database an indication that a same identifier number of said behavioral biometric cookie data-item, corresponds to two different human users; storing in the remote database two sub-records that correspond respectively to two extracted behavioral biometric models of said two different human users, wherein both of the two sub-records are associated with said single same identifier number of said behavioral biometric cookie data-item.

In some embodiments, the method comprises: (a) in a subsequent usage session of said computerized service, monitoring fresh user interactions of a current user, and comparing the fresh user interactions to multiple previously-stored records of previously-extracted behavioral biometric models of multiple users; (b) determining that the fresh user interactions match a particular record out of the multiple previously-stored records of previously-extracted behavioral biometric models of multiple users; (c) determining that the current user, who performed the fresh user interactions, is the same human user as the user that previously performed interactions associated with said particular record.

In some embodiments, the method comprises: (a) in a subsequent usage session of said computerized service, monitoring fresh user interactions of a current user, and comparing the fresh user interactions to multiple previously-stored records of previously-extracted behavioral biometric models of multiple users; (b) determining that the fresh user interactions match a particular record out of the multiple previously-stored records of previously-extracted behavioral biometric models of multiple users; (c) determining that the current user, who performed the fresh user interactions, is the same human user as the user that previously performed interactions associated with said particular record; (d) selecting a content item to be served to the current user, based on a usage history that comprises historic usage of the computerized service by said user associated with said particular record.

In some embodiments, the method comprises: (a) in a subsequent usage session of said computerized service, monitoring fresh user interactions of a current user, and comparing the fresh user interactions to multiple previously-stored records of previously-extracted behavioral biometric models of multiple users that were previously associated with a same behavioral biometric cookie identifier number; (b) determining that the fresh user interactions match a particular record out of the multiple previously-stored records of previously-extracted behavioral biometric models of multiple users; (c) determining that the current user, who performed the fresh user interactions, is the same human user as the user that previously performed interactions associated with said particular record.

In some embodiments, the method comprises: (a) in a subsequent usage session of said computerized service, monitoring fresh user interactions of a current user, and comparing the fresh user interactions to multiple previously-stored records of previously-extracted behavioral biometric models of multiple users that were previously associated with a same behavioral biometric cookie identifier number; (b) determining that the fresh user interactions match a particular record out of the multiple previously-stored records of previously-extracted behavioral biometric models of multiple users; (c) determining that the current user, who performed the fresh user interactions, is the same human user as the user that previously performed interactions associated with said particular record; (d) selecting a content item to be served to the current user, based on a usage history that comprises historic usage of the computerized service by said user associated with said particular record.

In some embodiments, the method comprises: (a) in a subsequent usage session of said computerized service, monitoring fresh user interactions of a current user, and comparing the fresh user interactions to multiple previously-stored records of previously-extracted behavioral biometric models of multiple users; (b) based on the monitored fresh user interactions of said current user, determining whether said current user is one of two or more particular users that were previously identified based on behavioral biometric analysis of their previous user interactions and who share the same behavioral biometric cookie identifier number with the current user.

In some embodiments, the method comprises: (a) in a subsequent usage session of said computerized service, monitoring fresh user interactions of a current user, and comparing the fresh user interactions to multiple previously-stored records of previously-extracted behavioral biometric models of multiple users; (b) based on the monitored fresh user interactions of said current user, determining whether said current user is one of two or more particular users that were previously identified based on behavioral biometric analysis of their previous user interactions and who share the same behavioral biometric cookie identifier number with the current user; (c) if the checking result of step (b) is positive, then: selecting a content item to be served to the current user, based on a usage history that comprises historic usage of the computerized service by said current user during previous usage sessions that shared the same behavioral biometric cookie identifier number.

In some embodiments, the method comprises: (a) in a subsequent usage session of said computerized service, monitoring fresh user interactions of a current user, and comparing the fresh user interactions to multiple previously-stored records of previously-extracted behavioral biometric models of multiple users; (b) based on the monitored fresh user interactions of said current user, determining whether said current user is one of two or more particular users that were previously identified based on behavioral biometric analysis of their previous user interactions and who share the same behavioral biometric cookie identifier number with the current user; (c) if the checking result of step (b) is negative, then: storing in said remote database an indication that the current user is a different user that is added to one or more previously-identified users that share the same behavioral biometric cookie identifier number.

In some embodiments, the method comprises: in a subsequent usage session of said computerized service, reading a locally-stored behavioral biometric cookie, monitoring fresh user interactions of a current user, and accessing said remote database to retrieve one or more previously-extracted behavioral biometric models that were previously extracted and that were previously associated with said behavioral biometric cookie.

In some embodiments, the method comprises: (a) in a subsequent usage session of said computerized service, reading a locally-stored behavioral biometric cookie, monitoring fresh user interactions of a current user, and accessing said remote database to retrieve one or more previously-extracted behavioral biometric models that were previously extracted and that were previously associated with said behavioral biometric cookie; (b) determining which particular model, out of two or more previously-extracted behavioral biometric models, that were previously extracted and that were previously associated with said behavioral biometric cookie, matches the fresh user interactions of said current user.

In some embodiments, the method comprises: (a) in a subsequent usage session of said computerized service, reading a locally-stored behavioral biometric cookie, monitoring fresh user interactions of a current user, and accessing said remote database to retrieve one or more previously-extracted behavioral biometric models that were previously extracted and that were previously associated with said behavioral biometric cookie; (b) determining which particular behavioral biometric model, out of two or more previously-extracted behavioral biometric models, that were previously extracted and that were previously associated with said behavioral biometric cookie, matches the fresh user interactions of said current user; (c) based on the particular behavioral biometric model that was determined in step (b), selecting a content item to be presented to said current user, by taking into account historic usage data of said current user, and by discarding from said selecting process an historic usage data of one or more other users that are associated with the same behavioral biometric cookie.

In some embodiments, the method comprises: (a) in a subsequent usage session of said computerized service, checking whether a locally-stored behavioral biometric cookie is stored within said electronic device; (b) if the checking result is negative, then: (I) monitoring fresh user interactions of a current user of said electronic device; and extracting from the monitored fresh user interaction a current behavioral biometric model that characterizes said current user; (II) checking whether said current behavioral biometric model, that characterizes said current user, matches one or more previously-extracted behavioral biometric models that were previously extracted in a previous usage session having a same Internet Protocol (IP) address as said subsequent usage session; (III) if the checking result of step (III) is positive, then: generating a new behavioral biometric cookie data-item, and storing it internally within the electronic device, and generating a tag that indicates that said new behavioral biometric cookie data-item reflects a continuation of a particular previously-extracted behavioral biometric model that was found to match said current behavioral biometric model.

In some embodiments, the method comprises: (a) in a subsequent usage session of said computerized service, checking whether a locally-stored behavioral biometric cookie is stored within said electronic device; (b) if the checking result is negative, then: (I) monitoring fresh user interactions of a current user of said electronic device; and extracting from the monitored fresh user interaction a current behavioral biometric model that characterizes said current user; (II) checking whether said current behavioral biometric model, that characterizes said current user, matches one or more previously-extracted behavioral biometric models that were previously extracted in a previous usage session having a different Internet Protocol (IP) address as said subsequent usage session; (III) if the checking result of step (III) is positive, then: generating a new behavioral biometric cookie data-item, and storing it internally within the electronic device, and generating a tag that indicates that said new behavioral biometric cookie data-item reflects a continuation of a particular previously-extracted behavioral biometric model that was found to match said current behavioral biometric model.

In some embodiments, the method comprises: (a) in a subsequent usage session of said computerized service, checking whether a locally-stored behavioral biometric cookie is stored within said electronic device; (b) if the checking result is negative, then: (I) monitoring fresh user interactions of a current user of said electronic device; and extracting from the monitored fresh user interaction a current behavioral biometric model that characterizes said current user; (II) checking whether said current behavioral biometric model, that characterizes said current user, matches one or more previously-extracted behavioral biometric models that were previously extracted in a previous usage session having a same web-browser as said subsequent usage session; (III) if the checking result of step (III) is positive, then: generating a new behavioral biometric cookie data-item, and storing it internally within the electronic device, and generating a tag that indicates that said new behavioral biometric cookie data-item reflects a continuation of a particular previously-extracted behavioral biometric model that was found to match said current behavioral biometric model.

In some embodiments, the method comprises: (a) in a subsequent usage session of said computerized service, checking whether a locally-stored behavioral biometric cookie is stored within said electronic device; (b) if the checking result is negative, then: (I) monitoring fresh user interactions of a current user of said electronic device; and extracting from the monitored fresh user interaction a current behavioral biometric model that characterizes said current user; (II) checking whether said current behavioral biometric model, that characterizes said current user, matches one or more previously-extracted behavioral biometric models that were previously extracted in a previous usage session having a different web-browser as said subsequent usage session; (III) if the checking result of step (III) is positive, then: generating a new behavioral biometric cookie data-item, and storing it internally within the electronic device, and generating a tag that indicates that said new behavioral biometric cookie data-item reflects a continuation of a particular previously-extracted behavioral biometric model that was found to match said current behavioral biometric model.

In some embodiments, the method comprises: based on said behavioral cookie data-item, differentiating between: (i) a first human user who utilizes said electronic device via a first web-browser, and (ii) a second human user who utilizes said electronic device via a second, different, web-browser.

In some embodiments, the method comprises: based on said behavioral cookie data-item, differentiating between: (i) a first human user who utilizes said electronic device from a particular Internet Protocol (IP) address, and (ii) a second human user who utilizes said electronic device from said particular IP address.

In some embodiments, the method comprises: based on said behavioral cookie data-item, differentiating between: (i) a human user who utilizes said electronic device, and (ii) an automated script that emulates a human user, the automated script running on said electronic device.

In some embodiments, the method comprises: based on said behavioral cookie data-item, differentiating between: (i) a human user who utilizes said electronic device via a first web-browser, and (ii) an automated script that emulates a human user, the automated script running on said electronic device, the automated script utilizing a second, different, web-browser.

In some embodiments, the method comprises: based on said behavioral cookie data-item, differentiating between: (i) a human user who utilizes said electronic device from a particular Internet Protocol (IP) address, and (ii) an automated script that emulates a human user, the automated script running on said electronic device, the automated script running from said particular IP address.

In some embodiments, the method comprises: based on said behavioral cookie data-item, differentiating between: (i) a first human user who utilizes said electronic device, and (ii) a second human user who utilizes said electronic device, and (iii) an automated script that emulates a human user, the automated script running on said electronic device.

In some embodiments, the method comprises: generating a conventional HTTP cookie that tracks browsing history of all human users of said electronic device; generating a first behavioral sub-cookie data-item that selectively tracks only browsing history of a first human user of said electronic device; generating a second behavioral sub-cookie data-item that selectively tracks only browsing history of a second, different, human user of said electronic device.

In some embodiments, the method comprises: generating a conventional HTTP cookie that tracks browsing history of all human users of said electronic device; generating a first behavioral sub-cookie data-item that selectively tracks only browsing history of a first human user of said electronic device; generating a second behavioral sub-cookie data-item that selectively tracks only browsing history of a second, different, human user of said electronic device; wherein the method comprises: classifying a current usage session of the electronic device, as belonging either to the first human user or to the second human user, based on user-specific behavioral attributes that are extracted from current user interactions via the input unit of the electronic device.

In some embodiments, the method comprises: generating a conventional HTTP cookie that tracks browsing history of all human users of said electronic device; generating a first behavioral sub-cookie data-item that selectively tracks only browsing history of a first human user of said electronic device; generating a second behavioral sub-cookie data-item that selectively tracks only browsing history of a second, different, human user of said electronic device; wherein the method comprises: classifying a current usage session of the electronic device, as belonging either to the first human user or to the second human user, based on user-specific behavioral attributes that are extracted from current user interactions via the input unit of the electronic device, wherein said classifying is performed even if all usage sessions to be classified originate from a same Internet Protocol (IP) address and from a same browser application.

In some embodiments, the method comprises: performing an automated process of real-time bidding among multiple advertising entities who bid on an advertisement placement that takes into account data reflected in said behavioral cookie data-item.

In some embodiments, the method comprises: generating a cross-device behavioral cookie data-item that tracks browsing history of a single user across multiple electronic device, based on said set of user-specific behavioral characteristics that are extracted from user interactions via multiple input units of multiple respective electronic devices.

In some embodiments, the method comprises: extracting a first set of user-specific behavioral characteristics from user interactions that are performed via a first input unit of a first electronic device; extracting a second set of user-specific behavioral characteristics from user interactions that are performed via a second input unit of a second electronic device; determining a match between the first and the second sets of user-specific behavioral characteristics; based on said determining, generating a cross-device behavioral cookie data-item that tracks browsing history of a single user across multiple electronic device.

In some embodiments, the method comprises: extracting a first set of user-specific behavioral characteristics from user interactions that are performed via a first input unit of a first electronic device; extracting a second set of user-specific behavioral characteristics from user interactions that are performed via a second input unit of a second electronic device; determining a match between the first and the second sets of user-specific behavioral characteristics; based on said determining, generating a cross-device behavioral cookie data-item that tracks browsing history of a single user across multiple electronic device; storing said cross-device behavioral cookie data-item on at least one of said first electronic device and said second electronic device.

In some embodiments, the method comprises: extracting a first set of user-specific behavioral characteristics from user interactions that are performed via a first input unit of a first electronic device; extracting a second set of user-specific behavioral characteristics from user interactions that are performed via a second input unit of a second electronic device; determining a match between the first and the second sets of user-specific behavioral characteristics; based on said determining, generating a cross-device behavioral cookie data-item that tracks browsing history of a single user across multiple electronic device; storing said cross-device behavioral cookie data-item on at least a remote server that is operable associated with both said first electronic device and said second electronic device.

In some embodiments, the method comprises: extracting a first set of user-specific behavioral characteristics from user interactions that are performed via a first input unit of a first electronic device; extracting a second set of user-specific behavioral characteristics from user interactions that are performed via a second input unit of a second electronic device; determining a match between the first and the second sets of user-specific behavioral characteristics; based on said determining, generating a cross-device behavioral cookie data-item that tracks browsing history of a single user across multiple electronic device; storing said cross-device behavioral cookie data-item on at least one of said first electronic device and said second electronic device; based on said cross-device behavioral cookie data-item, selecting an advertisement to be displayed on said first electronic device, based on combined browsing history that said user performed on both the first electronic device and the second electronic device.

In some embodiments, the method comprises: extracting a first set of user-specific behavioral characteristics from user interactions that are performed via a first input unit of a first electronic device; extracting a second set of user-specific behavioral characteristics from user interactions that are performed via a second input unit of a second electronic device; determining a match between the first and the second sets of user-specific behavioral characteristics; based on said determining, generating a cross-device behavioral cookie data-item that tracks browsing history of a single user across multiple electronic device; storing said cross-device behavioral cookie data-item on at least one of said first electronic device and said second electronic device; based on said cross-device behavioral cookie data-item, selecting an advertisement to be displayed on said first electronic device, based on browsing history that comprises at least a segment of browsing history of said user that was performed only on the second electronic device and not on the first electronic device.

In some embodiments, the method comprises: extracting a first set of user-specific behavioral characteristics from user interactions that are performed via a first input unit of a first electronic device; extracting a second set of user-specific behavioral characteristics from user interactions that are performed via a second input unit of a second electronic device; determining a match between the first and the second sets of user-specific behavioral characteristics; based on said determining, generating a cross-device behavioral cookie data-item that tracks browsing history of a single user across multiple electronic device; storing said cross-device behavioral cookie data-item on at least one of said first electronic device and said second electronic device; performing an automated process of real-time bidding among multiple advertising entities who bid on an advertisement placement that takes into account data reflected in said cross-device behavioral cookie data-item.

In some embodiments, the method comprises: (a) during a logged-in usage session, monitoring user-interactions and extracting a first user-specific behavioral feature; (b) subsequently, during said logged-in usage session, monitoring user-interactions, and detecting that they do not exhibit said first user-specific behavioral feature; (c) based on the detecting of step (b), performing a forced log-out of said logged-in usage session.

In some embodiments, the method comprises: (a) during a logged-in usage session, monitoring user-interactions and extracting a first user-specific behavioral feature; (b) subsequently, during said logged-in usage session, monitoring user-interactions, and detecting that they exhibit a second, different, user-specific behavioral feature that was not observed in the user-interactions monitored in step (a); and, (c) based on the detecting of step (b), performing a forced log-out of said logged-in usage session.

In some embodiments, a method comprises: (A) monitoring user interactions that a user performs via an input unit of an electronic device, when the user interacts through a computerized service with a remote server; (B) extracting from the monitored user interactions, a behavioral biometric model that characterize said user interactions; (C) generating a first behavioral cookie data-item that selectively tracks only usage history of a first particular human user of said electronic device based on behavioral attributes that are extracted from user interactions and that are unique to said first particular human user; (D) generating a second behavioral cookie data-item that selectively tracks only usage history of a second particular human user of said electronic device based on behavioral attributes that are extracted from user interactions and are unique to said second particular human user; (E) classifying a usage session that is performed via said electronic device, as belonging either to the first particular human user or to the second particular human user, based on user-specific behavioral attributes that are extracted from current user interactions via the input unit of said electronic device.

In some embodiments, a behavioral cookie data-item, that is generated in step (C) or in step (D), is generated by performing: (aa) storing in a remote database, that is external to said electronic device, a record indicating (i) the extracted behavioral biometric model of said user, and (ii) a unique identifier; (bb) generating, and storing internally within said electronic device, a behavioral biometric cookie data-item that reflects an association between: (I) said user, and (II) said record reflecting the extracted behavioral biometric model that is stored in said remote database.

In some embodiments, the method comprises: in a subsequent usage session, monitoring fresh user interactions of a current user, extracting from the fresh user interactions a fresh behavioral biometric model, matching between the fresh behavioral model and a particular previously-created behavioral biometric cookie data-item, determining that the current user who performed the fresh user interactions, is the same human user as the user that previously performed interactions associated with said particular previously-created behavioral biometric cookie data-item.

In some embodiments, the method comprises: based on said behavioral cookie data-item, differentiating between: (i) a first human user who utilizes said electronic device via a first web-browser, and (ii) a second human user who utilizes said electronic device via a second, different, web-browser.

In some embodiments, the method comprises: based on said behavioral cookie data-item, differentiating between: (i) a first human user who utilizes said electronic device from a particular Internet Protocol (IP) address, and (ii) a second human user who utilizes said electronic device from said particular IP address.

In some embodiments, the method comprises: based on said behavioral cookie data-item, differentiating between: (i) a human user who utilizes said electronic device, and (ii) an automated script that emulates a human user, wherein the automated script is running on said electronic device.

In some embodiments, the behavioral cookie data-item comprises at least a Global Unique Identifier (GUID) able to track a user, based on behavioral attributes, across multiple different devices, and across multiple different browsers, and across multiple different Internet Protocol (IP) addresses.

In some embodiments, the a process comprises: (A) monitoring user interactions that a user performs via an input unit of an electronic device, when the user interacts through a computerized service with a remote server; (B) extracting from the monitored user interactions, a behavioral biometric model that characterize said user interactions; (C) checking whether a behavioral biometric cookie is already locally-stored within said electronic device; (D) if the checking result of step (C) is negative, then: (D1) monitoring fresh user interactions of a current user of said electronic device; and extracting from the monitored fresh user interaction a current behavioral biometric model that characterizes the current user; (D2) checking whether said current behavioral biometric model, that characterizes the current user, matches one or more previously-extracted behavioral biometric models that were previously extracted in a previous usage session having a same Internet Protocol (IP) address; (D3) if the checking result of step (D2) is positive, then: generating a new behavioral biometric cookie data-item, and storing it internally within the electronic device, and generating a tag that indicates that said new behavioral biometric cookie data-item reflects a continuation of a particular previously-extracted behavioral biometric model that was found to match said current behavioral biometric model. In some embodiments, the behavioral cookie data-item comprises at least a Global Unique Identifier (GUID) able to track a user, based on behavioral attributes, across multiple different devices, and across multiple different browsers, and across multiple different Internet Protocol (IP) addresses.

In some embodiments, a method comprises: (A) monitoring user interactions that one or more users perform via one or more input units of one or more electronic devices; (B1) extracting a first set of user-specific behavioral characteristics from user interactions that are performed via a first input unit of a first electronic device; (B2) extracting a second set of user-specific behavioral characteristics from user interactions that are performed via a second input unit of a second electronic device; (C) determining a match between the first and the second sets of user-specific behavioral characteristics; (D) based on said determining of step (C), generating a cross-device behavioral cookie data-item that tracks usage history of a single user across multiple electronic device; (E) storing said cross-device behavioral cookie data-item on at least one of said first electronic device and said second electronic device.

In some embodiments, a behavioral cookie data-item that is generated in step (D), is generated by performing: (aa) storing in a remote database, that is external to said electronic device, a record indicating (i) an extracted behavioral biometric model of a user, and (ii) a unique identifier; (bb) generating, and storing internally within said electronic device, a behavioral biometric cookie data-item that reflects an association between: (I) said user, and (II) said record reflecting the extracted behavioral biometric model that is stored in said remote database. In some embodiments, the behavioral cookie data-item comprises at least a Global Unique Identifier (GUID) able to track a user, based on behavioral attributes, across multiple different devices, and across multiple different browsers, and across multiple different Internet Protocol (IP) addresses.

In some embodiments, a method comprises: (A) monitoring user interactions that a user performs via an input unit of an electronic device, when the user interacts through a computerized service with a remote server; (B) extracting from the monitored user interactions, a behavioral biometric model that characterizes said user interactions; (C) generating a behavioral biometric cookie data-item that selectively tracks usage history of a first particular human user of said electronic device based on behavioral attributes that are extracted from user interactions and that are unique to said first particular human user; (D) utilizing said behavioral biometric cookie data-item as a Global Unique Identifier (GUID) that tracks said user across multiple different devices, and across multiple different browsers, and across multiple different Internet Protocol (IP) addresses, based on a match between: (i) behavioral attributes that are extracted from fresh user interactions, and (ii) the behavioral biometric model that is indicated by said behavioral biometric cookie data-item.

In some embodiments, the method comprises: in a first-ever visit of a user to a certain website, determining that said user is the same human user that had already visited another website, based on matching between: (i) behavioral attributes that are extracted from fresh user interactions, and (ii) the behavioral biometric model that is indicated by said behavioral biometric cookie data-item.

In some embodiments, a process comprises: (A) monitoring user interactions that a user performs via an input unit of an electronic device, when the user interacts through a computerized service with a remote server; (B) extracting from the monitored user interactions, a behavioral biometric model that characterizes at least the user interactions at a particular computerized service and that does not necessarily characterizes user interactions at other computerized services; (C) generating a computerized-service-specific behavioral biometric cookie data-item, that selectively tracks only usage history of a particular human within said particular computerized service based on behavioral attributes that are extracted from user interactions and that are unique to said particular human user at said particular computerized service; (D) utilizing said computerized-service-specific behavioral biometric cookie data-item as a Global Unique Identifier (GUID) that tracks said user when said user accesses said particular computerized service, across multiple different devices and across multiple different browsers, and across multiple different Internet Protocol (IP) addresses, based on a match between: (i) behavioral attributes that are extracted from fresh user interactions, and (ii) the behavioral biometric model that is indicated by said computerized-service-specific behavioral biometric cookie data-item. In some embodiments, the process further comprises: (E) selecting a content item for serving to a user of said particular computerized service, based on usage history that was tracked by the computerized-service-specific behavioral biometric cookie data-item.

The term "computerized-service specific" as used herein may be, for example, "website specific" (e.g., specific to a particular website, or to a particular domain), or may be "application specific" (e.g., specific to a particular "app" or mobile application).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
   (A) monitoring user interactions that a user performs via an input unit of an electronic device, when the user interacts through a computerized service with a remote server;
   (B) extracting from the monitored user interactions, a behavioral biometric model that characterize said user interactions;
   (C) generating a first behavioral cookie data-item that selectively tracks only usage history of a first particular human user of said electronic device based on behavioral attributes that are extracted from user interactions and that are unique to said first particular human user;
   (D) generating a second behavioral cookie data-item that selectively tracks only usage history of a second particular human user of said electronic device based on behavioral attributes that are extracted from user interactions and are unique to said second particular human user;
   (E) classifying a usage session that is performed via said electronic device, as belonging either to the first particular human user or to the second particular human user, based on user-specific behavioral attributes that are extracted from current user interactions via the input unit of said electronic device,
   wherein the behavioral cookie data-item comprises at least a Global Unique Identifier (GUID) able to track a user, based on behavioral attributes, across multiple different devices, and across multiple different browsers, and across multiple different Internet Protocol (IP) addresses.

2. The method of claim 1, wherein a behavioral cookie data-item, that is generated in step (C) or in step (D), is generated by performing:
   (aa) storing in a remote database, that is external to said electronic device, a record indicating (i) the extracted behavioral biometric model of said user, and (ii) a unique identifier;
   (bb) generating, and storing internally within said electronic device, a behavioral biometric cookie data-item that reflects an association between: (I) said user, and (II) said record reflecting the extracted behavioral biometric model that is stored in said remote database.

3. The method of claim 1, further comprising:
   in a subsequent usage session,
   monitoring fresh user interactions of a current user,
   extracting from the fresh user interactions a fresh behavioral biometric model,
   matching between the fresh behavioral model and a particular previously-created behavioral biometric cookie data-item,
   determining that the current user who performed the fresh user interactions, is the same human user as the user that previously performed interactions associated with said particular previously-created behavioral biometric cookie data-item.

4. The method of claim 1, comprising:
   based on said behavioral cookie data-item, differentiating between: (i) a first human user who utilizes said electronic device via a first web-browser, and (ii) a second human user who utilizes said electronic device via a second, different, web-browser.

5. The method of claim 1, comprising:
   based on said behavioral cookie data-item, differentiating between: (i) a first human user who utilizes said electronic device from a particular Internet Protocol (IP) address, and (ii) a second human user who utilizes said electronic device from said particular IP address.

6. The method of claim 1, comprising:
   based on said behavioral cookie data-item, differentiating between: (i) a human user who utilizes said electronic device, and (ii) an automated script that emulates a human user, wherein the automated script is running on said electronic device.

7. A process comprising:
(A) monitoring user interactions that a user performs via an input unit of an electronic device, when the user interacts through a computerized service with a remote server;
(B) extracting from the monitored user interactions, a behavioral biometric model that characterize said user interactions;
(C) checking whether a behavioral biometric cookie is already locally-stored within said electronic device;
(D) when the checking result of step (C) is negative, then:
(D1) monitoring fresh user interactions of a current user of said electronic device; and extracting from the monitored fresh user interaction a current behavioral biometric model that characterizes the current user;
(D2) checking whether said current behavioral biometric model, that characterizes the current user, matches one or more previously-extracted behavioral biometric models that were previously extracted in a previous usage session having a same Internet Protocol (IP) address;
(D3) when the checking result of step (D2) is positive, then: generating a new behavioral biometric cookie data-item, and storing it internally within the electronic device, and generating a tag that indicates that said new behavioral biometric cookie data-item reflects a continuation of a particular previously-extracted behavioral biometric model that was found to match said current behavioral biometric model,
wherein the behavioral cookie data-item comprises at least a Global Unique Identifier (GUID) able to track a user, based on behavioral attributes, across multiple different devices, and across multiple different browsers, and across multiple different Internet Protocol (IP) addresses.

8. A method comprising:
(A) monitoring user interactions that one or more users perform via one or more input units of one or more electronic devices;
(B1) extracting a first set of user-specific behavioral characteristics from user interactions that are performed via a first input unit of a first electronic device;
(B2) extracting a second set of user-specific behavioral characteristics from user interactions that are performed via a second input unit of a second electronic device;
(C) determining a match between the first and the second sets of user-specific behavioral characteristics;
(D) based on said determining of step (C), generating a cross-device behavioral cookie data-item that tracks usage history of a single user across multiple electronic devices;
(E) storing said cross-device behavioral cookie data-item on at least one of said first electronic device and said second electronic device; and
wherein the behavioral cookie data-item comprises at least a Global Unique Identifier (GUID) able to track a user, based on behavioral attributes, across multiple different devices, and across multiple different browsers, and across multiple different Internet Protocol (IP) addresses.

9. The method of claim 8, wherein a behavioral cookie data-item that is generated in step (D), is generated by performing:
(aa) storing in a remote database, that is external to said electronic device, a record indicating (i) an extracted behavioral biometric model of a user, and (ii) a unique identifier;
(bb) generating, and storing internally within said electronic device, a behavioral biometric cookie data-item that reflects an association between: (I) said user, and (II) said record reflecting the extracted behavioral biometric model that is stored in said remote database.

10. A process comprising:
(A) monitoring user interactions that a user performs via an input unit of an electronic device, when the user interacts through a computerized service with a remote server;
(B) extracting from the monitored user interactions, a behavioral biometric model that characterizes at least the user interactions at a particular computerized service and that does not necessarily characterize user interactions at other computerized services;
(C) generating a computerized-service-specific behavioral biometric cookie data-item, that selectively tracks only usage history of a particular human within said particular computerized service based on behavioral attributes that are extracted from user interactions and that are unique to said particular human user at said particular computerized service;
(D) utilizing said computerized-service-specific behavioral biometric cookie data-item as a Global Unique Identifier (GUID) that tracks said user when said user accesses said particular computerized service, across multiple different devices and across multiple different browsers, and across multiple different Internet Protocol (IP) addresses, based on a match between: (i) behavioral attributes that are extracted from fresh user interactions, and (ii) the behavioral biometric model that is indicated by said computerized-service-specific behavioral biometric cookie data-item.

11. The process of claim 10, further comprising:
(E) selecting a content item for serving to a user of said particular computerized service, based on usage history that was tracked by the computerized-service-specific behavioral biometric cookie data-item.

* * * * *